US012563399B2

(12) United States Patent
Lee

(10) Patent No.: US 12,563,399 B2
(45) Date of Patent: Feb. 24, 2026

(54) APPARATUS AND METHOD FOR REMOTE CONTROL OF ELECTRONIC DEVICE

(71) Applicant: Samsung Electronics Co., Ltd., Suwon-si (KR)

(72) Inventor: Lyesuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 18/482,542

(22) Filed: Oct. 6, 2023

(65) Prior Publication Data

US 2024/0121616 A1 Apr. 11, 2024

Related U.S. Application Data

(63) Continuation of application No. PCT/KR2023/015440, filed on Oct. 6, 2023.

(30) Foreign Application Priority Data

Oct. 6, 2022 (KR) ........................ 10-2022-0127599
Dec. 14, 2022 (KR) ........................ 10-2022-0175025

(51) Int. Cl.
*H04L 29/06* (2006.01)
*H04L 9/08* (2006.01)
(Continued)

(52) U.S. Cl.
CPC ........... *H04W 12/71* (2021.01); *H04L 9/0861* (2013.01); *H04L 9/0894* (2013.01); *H04W 12/03* (2021.01); *H04W 12/30* (2021.01); *H04W 12/42* (2021.01)

(58) Field of Classification Search
CPC ..... H04W 12/71; H04W 12/03; H04W 12/30; H04W 12/42; H04W 12/08; H04L 9/0861; H04L 9/0894
See application file for complete search history.

(56) References Cited

U.S. PATENT DOCUMENTS 6,529,983 B1 * 3/2003 Marshall ................... G06F 9/52
710/200
9,153,120 B1 10/2015 Xiao et al.
(Continued)

FOREIGN PATENT DOCUMENTS

KR 10-2006-0112597 A 11/2006
KR 10-2010-0011060 A 2/2010
(Continued)

OTHER PUBLICATIONS

International Search Report dated Jan. 16, 2024, issued in International Application No. PCT/KR2023/015440.
(Continued)

*Primary Examiner* — Shawnchoy Rahman
(74) *Attorney, Agent, or Firm* — Jefferson IP Law, LLP

(57) ABSTRACT

An apparatus for remote control of an electronic device is provided. The apparatus includes a communication module, a memory, and a processor. The processor may be configured to obtain key information associated with a first electronic device, receive a virtual identification (ID) and location information based on the key information from a second electronic device, identify the first electronic device corresponding to the virtual ID using the key information, encrypt a remote control function request message for the first electronic device using the key information, transmit the encrypted remote control function request message to the second electronic device, receive, from the second electronic device, a remote control function request processing result message encrypted in the first electronic device, obtain a remote control function request processing result, and other embodiments may be provided by decrypting the encrypted remote control function request processing result message using the key information.

20 Claims, 13 Drawing Sheets

(51) Int. Cl.

| | |
|---|---|
| *H04W 12/03* | (2021.01) |
| *H04W 12/30* | (2021.01) |
| *H04W 12/42* | (2021.01) |
| *H04W 12/71* | (2021.01) |

(56) References Cited

U.S. PATENT DOCUMENTS

| | | | |
|---|---|---|---|
| 9,686,686 | B1 | 6/2017 | Dalvi |
| 10,511,938 | B1 | 12/2019 | Marinovic et al. |
| 2006/0031399 | A1 | 2/2006 | Sherman et al. |
| 2014/0162765 | A1* | 6/2014 | Bai ......................... A63F 13/69 463/25 |
| 2019/0149953 | A1 | 5/2019 | Azam et al. |
| 2020/0107164 | A1 | 4/2020 | Lopatin et al. |
| 2020/0137578 | A1 | 4/2020 | Zeiler et al. |
| 2021/0232509 | A1 | 7/2021 | Pan |
| 2021/0256833 | A1 | 8/2021 | Daoura et al. |
| 2022/0232379 | A1 | 7/2022 | Shim |
| 2022/0321524 | A1* | 10/2022 | Suh ..................... H04L 61/5007 |

| | | | |
|---|---|---|---|
| 2023/0188942 | A1 | 6/2023 | Lee et al. |
| 2023/0188980 | A1 | 6/2023 | Lee et al. |
| 2023/0397000 | A1* | 12/2023 | Wifvesson .......... H04W 12/043 |

FOREIGN PATENT DOCUMENTS

| | | | | | |
|---|---|---|---|---|---|
| KR | 10-1442573 | B1 | | 9/2014 | |
| KR | 10-2022-0018876 | A | | 2/2022 | |
| KR | 10-2022-0105475 | A | | 7/2022 | |
| KR | 10-2023-0023231 | A | | 2/2023 | |
| WO | WO-9524809 | A1 | * | 9/1995 | ............ H04W 12/64 |
| WO | WO-0038472 | A1 | * | 6/2000 | ........ H04Q 11/0478 |
| WO | WO-2013126759 | A2 | * | 8/2013 | ........... H04L 9/0637 |
| WO | 2022/030844 | A1 | | 2/2022 | |
| WO | 2022/030845 | A1 | | 2/2022 | |

OTHER PUBLICATIONS

European Search Report dated Sep. 24, 2025, issued in European Patent Application No. 23875270.

\* cited by examiner

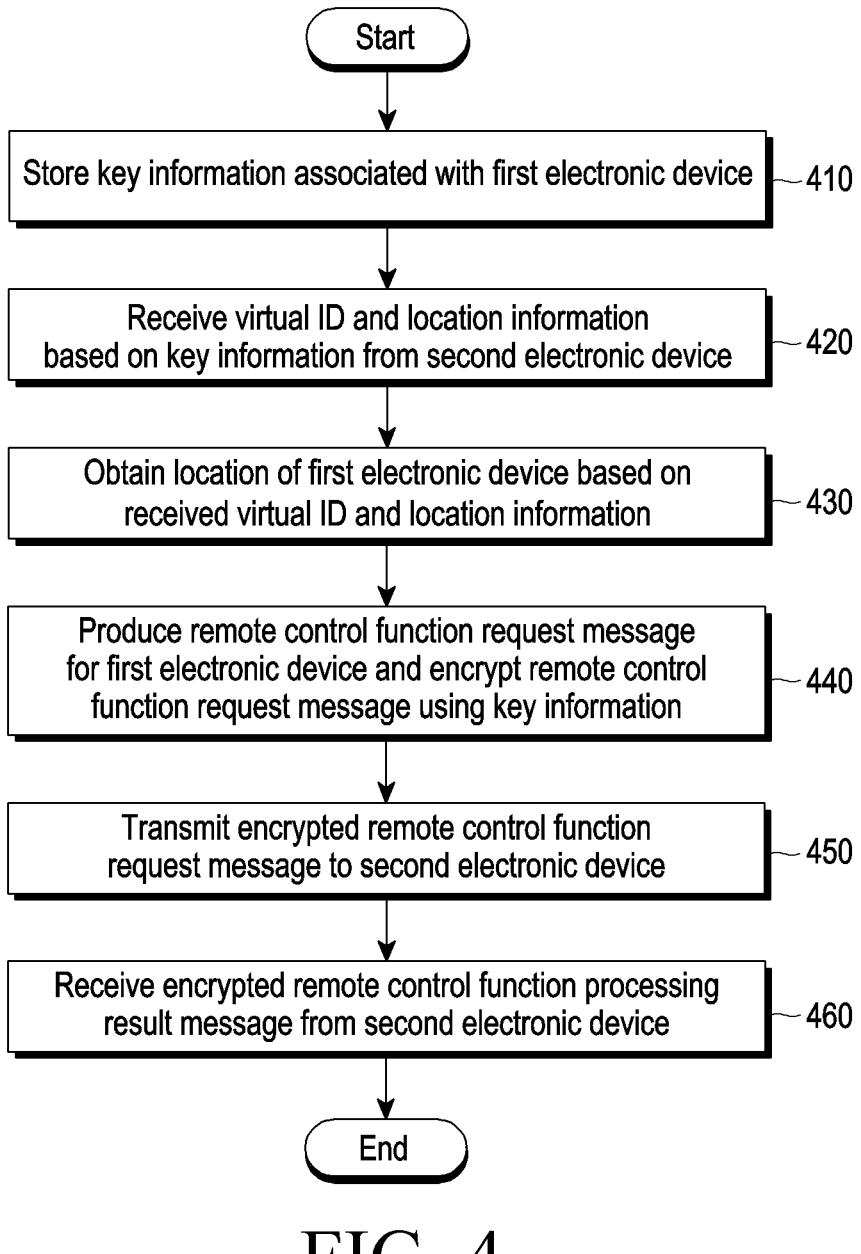

Start

Store key information associated with first electronic device ~410

Receive virtual ID and location information
based on key information from second electronic device ~420

Obtain location of first electronic device based on
received virtual ID and location information ~430

Produce remote control function request message
for first electronic device and encrypt remote control
function request message using key information ~440

Transmit encrypted remote control function
request message to second electronic device ~450

Receive encrypted remote control function processing
result message from second electronic device ~460

End

FIG. 4

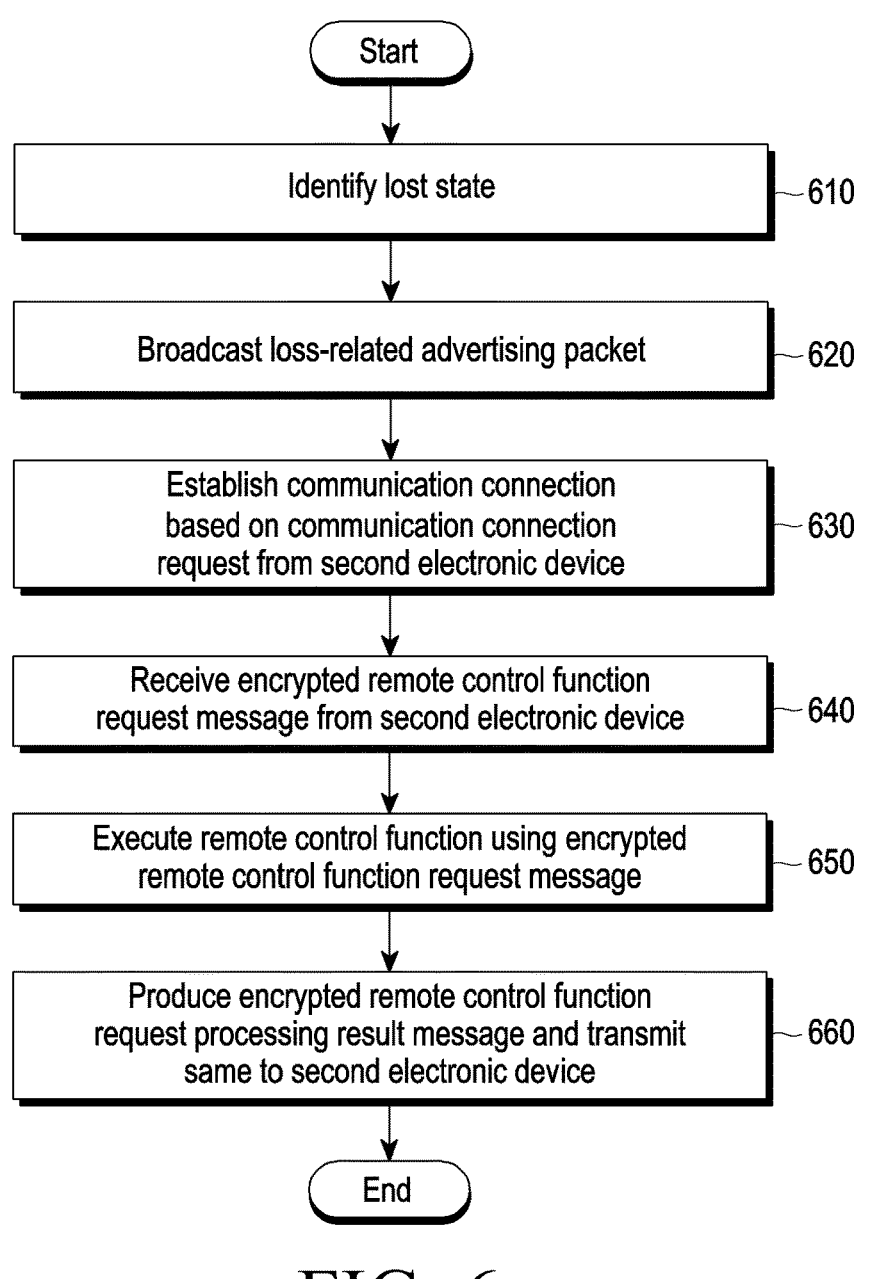

Start

Identify lost state ~610

Broadcast loss-related advertising packet ~620

Establish communication connection
based on communication connection
request from second electronic device ~630

Receive encrypted remote control function
request message from second electronic device ~640

Execute remote control function using encrypted
remote control function request message ~650

Produce encrypted remote control function
request processing result message and transmit
same to second electronic device ~660

End

Memory — Processor — Communication module

FIG. 7

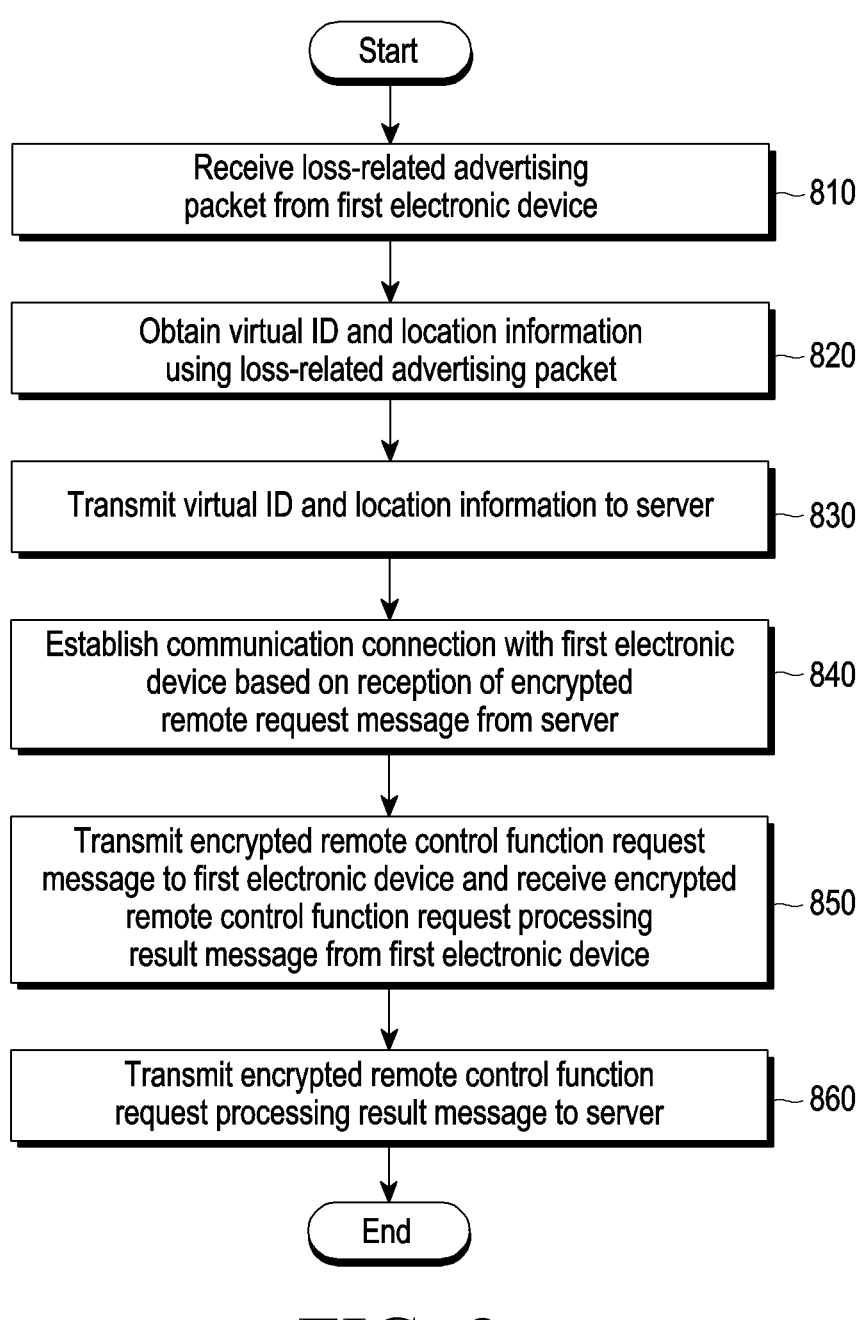

Start

Receive loss-related advertising
packet from first electronic device
~810

Obtain virtual ID and location information
using loss-related advertising packet
~820

Transmit virtual ID and location information to server
~830

Establish communication connection with first electronic
device based on reception of encrypted
remote request message from server
~840

Transmit encrypted remote control function request
message to first electronic device and receive encrypted
remote control function request processing
result message from first electronic device
~850

Transmit encrypted remote control function
request processing result message to server
~860

End

APPARATUS AND METHOD FOR REMOTE CONTROL OF ELECTRONIC DEVICE

CROSS-REFERENCE TO RELATED APPLICATION(S)

This application is a continuation application, claiming priority under § 365(c), of an International application No. PCT/KR2023/015440, filed on Oct. 6, 2023, which is based on and claims the benefit of a Korean patent application number 10-2022-0127599, filed on Oct. 6, 2022, in the Korean Intellectual Property Office, and of a Korean patent application number 10-2022-0175025, filed on Dec. 14, 2022, in the Korean Intellectual Property Office, the disclosure of each of which is incorporated by reference herein in its entirety.

TECHNICAL FIELD

The disclosure relates to an apparatus for remote control of electronic devices.

BACKGROUND ART

Various portable electronic devices are being provided to users, and users are able to access a variety of content while carrying various electronic devices. These portable electronic devices may perform various functions while exchanging data through wired or wireless network connections.

A user may lose an electronic device while carrying and using it. If the lost electronic device is connected to a network, the location of the lost electronic device may be recognized through the network. However, it may be difficult to find a lost electronic device if it is not connected to the network.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Even if an electronic device is not connected to a network, the electronic device may be found using Bluetooth low energy (BLE) advertising. For example, a user may find an electronic device that has lost communication with a parent terminal or has lost network connection due to a communication failure using Bluetooth low energy (BLE) advertising. A remote control method may be required to cause an electronic device to perform a specific function (e.g., a locking function or an initialization function) after finding the electronic device.

Aspects of the disclosure are to address at least the above-mentioned problems and/or disadvantages and to provide at least the advantages described below. Accordingly, an aspect of the disclosure is to provide an apparatus for remote control of electronic devices.

Additional aspects will be set forth in part in the description which follows and, in part, will be apparent from the description, or may be learned by practice of the presented embodiments.

In accordance with an aspect of the disclosure, an apparatus for remote control of an electronic device is provided. The apparatus includes a communication module, a memory, and a processor, wherein the processor is configured to obtain key information associated with a first electronic device, receive a virtual identification (ID) and location information based on the key information from a second electronic device, identify the first electronic device corresponding to the virtual ID using the key information, encrypt a remote control function request message for the first electronic device using the key information, transmit the encrypted remote control function request message to the second electronic device, receive, from the second electronic device, a remote control function request processing result message encrypted in the first electronic device in response to the encrypted remote control function request message, and obtain a remote control function request processing result by decrypting the encrypted remote control function request processing result message using the key information.

In accordance with another aspect of the disclosure, an electronic device is provided. The electronic device includes a communication module, a memory, and a processor, wherein the processor is configured to broadcast an advertising packet including a virtual ID corresponding to the electronic device based on a specified time elapsed after communication with an external electronic device using the communication module is disconnected, establish a communication connection with the external electronic device, based on a communication connection request received from the external electronic device in response to the advertising packet, receive an encrypted remote control function request message from the external electronic device through the communication connection, and decrypt the encrypted remote control function request message using key information related to the virtual ID and perform a remote control function based on the decrypted remote control function request message.

In accordance with another aspect of the disclosure, an electronic device is provided. The electronic device includes a communication module, a memory, and a processor, wherein the processor is configured to obtain location information of an external electronic device when an advertising packet including a virtual ID of the external electronic device is received from the external electronic device, transmit the virtual ID and the location information to an external server, receive, from the external server, an encrypted remote control function request message in response to transmission of the virtual ID and the location information, configured to establish a communication connection with the external electronic device, and transmit the encrypted remote control function request message to the external electronic device.

In accordance with another aspect of the disclosure, a method for remote control of an electronic device is provided. The method includes obtaining key information associated with a first electronic device, receiving a virtual ID and location information based on the key information from a second electronic device, identifying the first electronic device corresponding to the virtual ID using the key information, based on a remote control function request message for the first electronic device existing, encrypting the remote control function request message using the key information and transmitting the encrypted remote control function request message to the second electronic device, receiving, from the second electronic device, a remote control function request processing result message encrypted in the first electronic device in response to the encrypted remote control function request message, and decrypting the encrypted remote control function request processing result message using the key information to obtain a remote control function request processing result.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 4 is a flowchart illustrating the operation for remote control of an electronic device according to an embodiment of the disclosure;

FIG. 6 is a flowchart illustrating the operation of a first electronic device according to an embodiment of the disclosure;

FIG. 7 is a diagram illustrating the configuration of a second electronic device that assists in locating and remotely controlling a first electronic device according to an embodiment of the disclosure;

FIG. 8 is a flowchart illustrating the operation of a second electronic device that assists in locating and remotely controlling a first electronic device according to an embodiment of the disclosure;

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
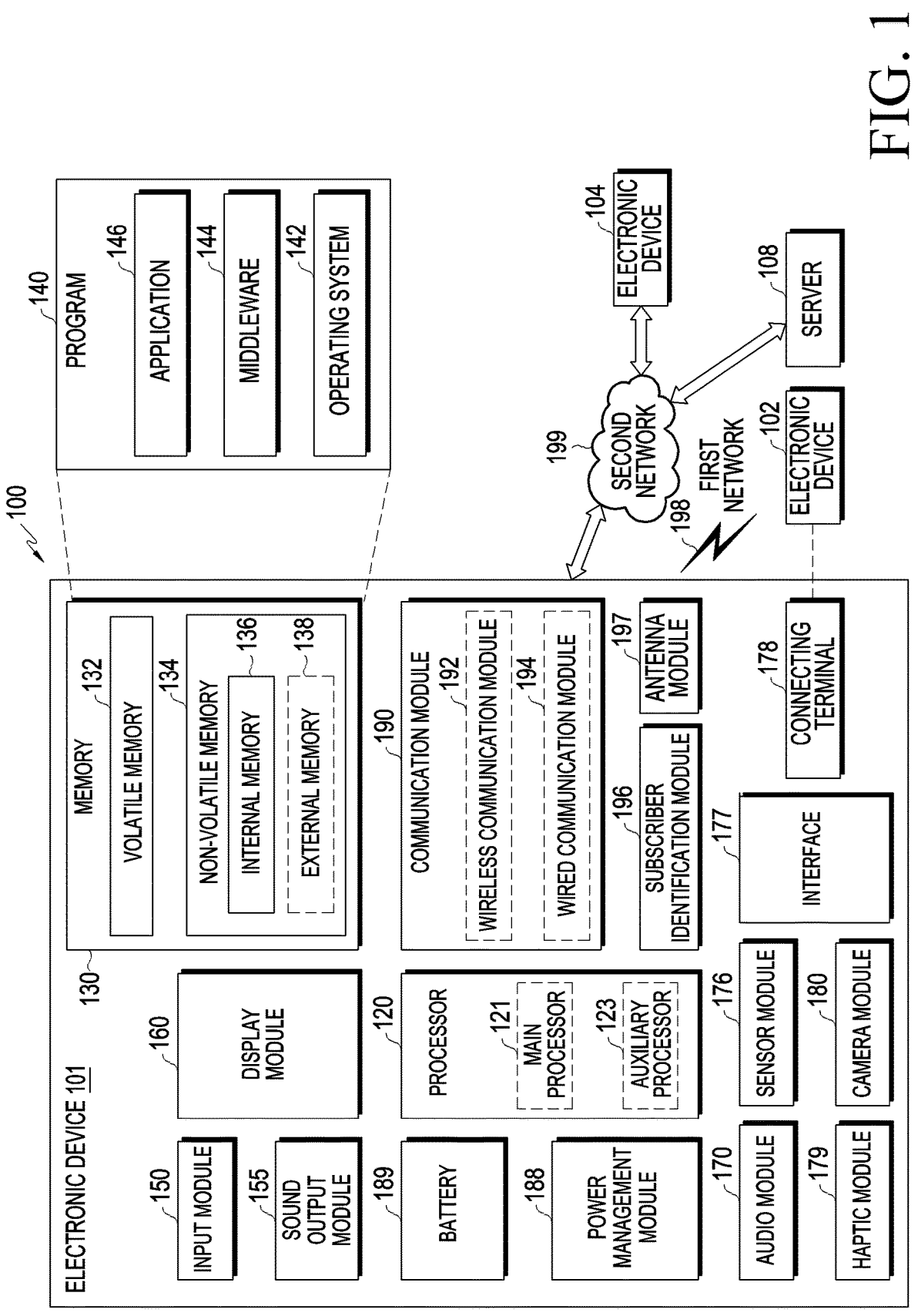
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
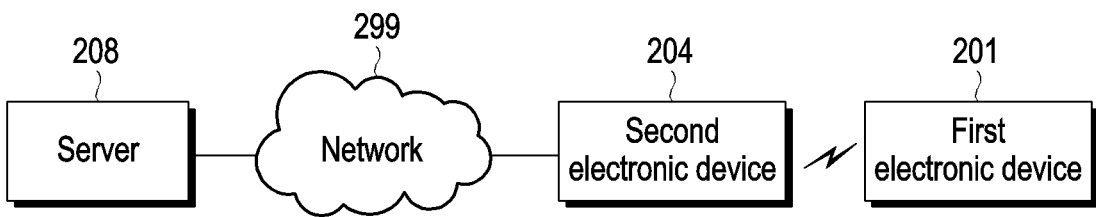
FIG. 2 is a diagram illustrating a network for remote control of an electronic device according to an embodiment of the disclosure.

FIG. 2 is a diagram illustrating a network for remote control of an electronic device according to an embodiment of the disclosure.

Referring to FIG. 2, a first electronic device 201 (e.g., the electronic device 101 in FIG. 1) may be a portable electronic device such as a mobile phone (e.g., a smartphone), a location tracker, a digital pen, a smart watch, or earbuds. The first electronic device 201 may be an electronic device in the state in which communication thereof is disconnected from an electronic device (hereinafter also referred to as "parent terminal") (not shown) that operates through pairing with the first electronic device 201 or in the state in which communication thereof is disconnected from a network 299. A server 208 (e.g., the server 108 in FIG. 1) may be an apparatus that performs a remote control operation of an electronic device and provide a service (e.g., an offline finding service) for obtaining the location and remote control of the first electronic device 201 disconnected from the parent terminal or disconnected from the network 299. A second electronic device 204 may be an electronic device around the first electronic device 201, which is able to assist in obtaining the location of the first electronic device 201 and remotely controlling the same.

Figure 3:
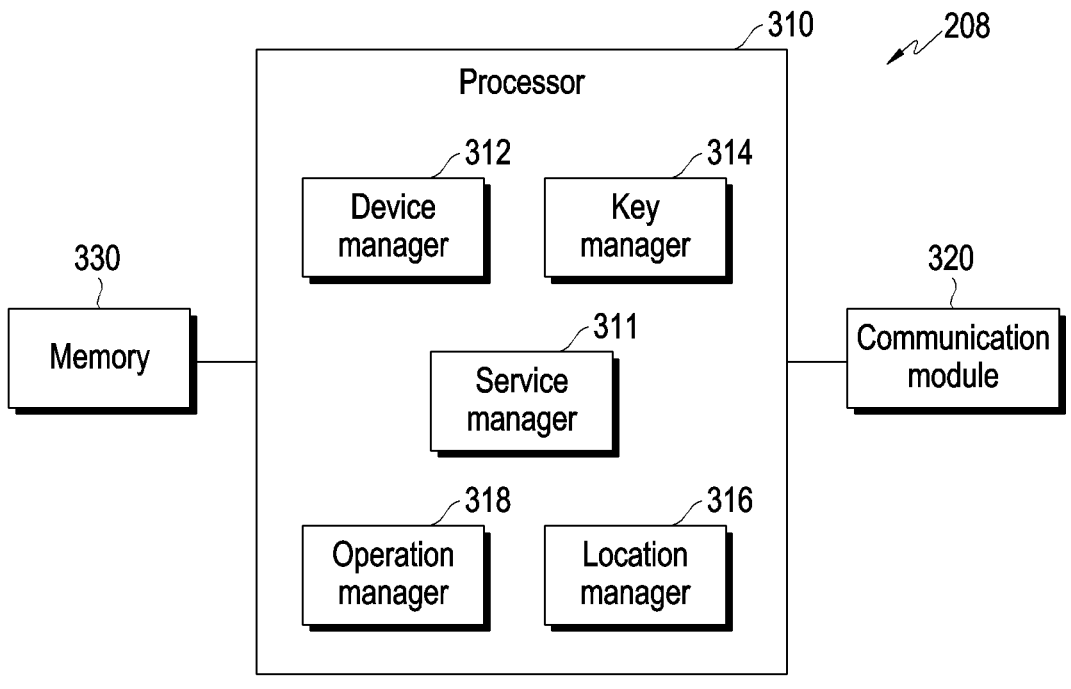
FIG. 3 is a diagram illustrating the configuration of an apparatus for remote control of an electronic device according to an embodiment of the disclosure.

FIG. 3 is a diagram illustrating the configuration of an apparatus for remote control of an electronic device according to an embodiment of the disclosure.

Referring to FIG. 3, an apparatus (e.g., the server 208) for remote control of an electronic device (e.g., the first electronic device 201) may include a processor 310, a communication module 320, and a memory 330, and may further include other elements in addition thereto.

Upon receiving a remote control request, the processor 310 according to an embodiment may register an electronic device (hereinafter referred to as a "first electronic device 201") to be located or remotely controlled. When registering the first electronic device 201, the processor 310 according to an embodiment may share key information for secure communication with the first electronic device 201. Key information may be used to produce a virtual ID of the first electronic device 201 or may be used to encrypt messages exchanged between the server 208 and the first electronic device 201. For example, end-to-end encryption may be used to encrypt messages exchanged between the server 208 and the first electronic device 201. The key information may include a secret key and/or an initial vector. For example, the secret key and/or the initial vector may include a 32-bit value or a 16-bit value. The processor 310 according to an embodiment may receive a location report including a virtual ID and location information based on the key information from an electronic device (e.g., the second electronic device 204) around the first electronic device 201, which may assist in obtaining the location of the first electronic device 201 and remotely controlling the same, through the communication module 320. The processor 310, based on the virtual ID and location information received from the second electronic device 204, may identify (or find) the first electronic device 201 and obtain the location of the first electronic device 201. The processor 310 may provide a user with information indicating that the first electronic device 201 has been found and/or location information of the first electronic device 201. The processor 310 may receive and store a remote control function requested for the first electronic device 201. If there is a remote control function requested for the first electronic device 201, the processor 310 may produce a remote control function request message for the first electronic device 201 and encrypt a remote control function request message that is produced using the key information shared with the first electronic device 201. The processor 310 may transmit the encrypted remote control function request message to the second electronic device 204. The encrypted remote control function request message may be transferred to the first electronic device 201 by the second electronic device 204. After executing a remote control function by the first electronic device 201 according to the encrypted remote control function request message, an encrypted remote control function processing result message may be transmitted to the second electronic device 204. The encrypted remote control function processing result message transmitted to the second electronic device 204 may be received by the processor 310 from the second electronic device 204 through the communication module 320.

The processor 310 may also receive a location report on the first electronic device 201 from other electronic devices around the first electronic device 201, as well as from the second electronic device 204. For example, the processor 310 may receive location reports on the first electronic device 201 from a plurality of electronic devices, respectively. The processor 310 according to an embodiment may manage function execution states in order to prevent redundant transmission of a remote request function message to the respective electronic devices in response to the respective location reports.

TABLE 1

| requestId | Targets | Command and additional data | Processing date and time | States |
|---|---|---|---|---|
| . . . | . . . | . . . | . . . | |
| 720671651640550829 | IMEI: 1234567890ABCDE | Lock, 123456 | 2022 May, 4 00:00 | fetched |
| . . . | . . . | . . . | . . . | |

Referring to Table 1 above, the processor 310 may classify and store states for respective virtual IDs (e.g., requestId), such as requested, fetched, re-requested, and executed. Requested may indicate the state in which there is a remote control function request message to be transmitted. Fetched may indicate the state in which a remote control function request message has been transmitted. Re-requested may indicate the state in which a remote control function request message must be retransmitted. If the electronic device (e.g., the second electronic device 204) to which a remote control function request message has been transmitted is specified, the processor 310 may change a state value into fetched and then cause the remote control function request message not to be transmitted to another electronic device.

If a requested remote control function processing result is not updated for a specified period of time (e.g., within 1 minute) after the fetched state (e.g., if the state does not switch to an executed state for a predetermined period of time after the last time at which it was fetched (processing date and time)), the processor 310 may switch the state from the fetched state to a re-requested state in order to allow a remote control function request message to be transmitted by another electronic device.

The processor 310 may include a service manager 311, a device manager 312, a key manager 314, a location manager 316, and/or an operation manager 318, and may further include additional managers (or modules) (e.g., a viewer manager) for other processing.

The service manager 311 may serve as a user interface or perform an operation of transmitting and receiving messages or information to and from the second electronic device 204. The device manager 312 may manage information of electronic devices for which an offline finding configuration is requested. If a remote control request is received, the key manager 314 may manage key information shared with each of at least one electronic device registered as an electronic device subject to location acquisition and remote control, and perform encryption and/or decryption and authentication using the key information. The location manager 316 may store and/or update location information of each of at least one electronic device for which offline finding configuration is requested. The operation manager 318 may manage and update information about a remote control function request message for each of at least one electronic device for which offline finding configuration is requested.

The communication module 320 may support establishment of a direct (e.g., wired) communication channel or wireless communication channel between the server 208 and the second electronic device 204, and communication through the established communication channel.

The server 208 may receive a remote control request for the first electronic device 201 from a user or another device through the communication module 320.

The memory 330 may store a variety of data and information used by the processor 310 and/or the communication module 320. The data may include, for example, software (e.g., programs) and input data or output data for commands related thereto. The memory 330 may include volatile memory or non-volatile memory. The memory 330 may store instructions for processing operations performed by the processor 310.

An apparatus for remote control of an electronic device according to an embodiment of the disclosure may include a communication module, a memory, and a processor. The processor may obtain key information related to a first electronic device. The processor may receive, from a second electronic device, a virtual ID and location information based on the key information. The processor may identify a first electronic device corresponding to the virtual ID using the key information. The processor may encrypt a remote control function request message for the first electronic device using the key information and transmit the encrypted remote control function request message to the second electronic device. The processor may receive an encrypted remote control function request processing result message, which is encrypted by the first electronic device, from the second electronic device in response to the encrypted remote control function request message. The processor may obtain a remote control function request processing result by decrypting the encrypted remote control function request processing result message using the key information.

The processor may be configured to generate the key information associated with the first electronic device and store the key information associated with the first electronic device in the memory, based on lost service registration for the first electronic device, and transmit the key information associated with the first electronic device to the first electronic device.

The key information may include a secret key and an initial vector.

The processor may be configured to generate a plurality of virtual IDs for device information of the first electronic device using the key information, store the plurality of virtual IDs in the memory, and identify the received virtual ID from among the plurality of virtual IDs.

The device information of the first electronic device may include an international mobile equipment identity (IMEI).

The processor may be configured to receive the remote control function request message for the first electronic device from a third electronic device.

According to an embodiment of the disclosure, a remote control function requested by the remote control function request message may be a locking function or an initialization function.

FIG. 4 is a flowchart illustrating the operation for remote control of an electronic device according to an embodiment of the disclosure.

Referring to FIG. 4, a processor 310 of a server 208 may perform at least one of operations 410 to 460.

In operation 410, the processor 310 may store, in the memory 330, key information associated with a first electronic device 201 subject to location acquisition and remote control when it is lost. The processor 310 may register a first electronic device 201, which is subject to location acquisition and remote control when it is lost, and share the key information with the first electronic device 201. The key information may be used to produce a virtual ID of the first electronic device 201 in the first electronic device 201 or may be used to encrypt messages exchanged between the server 208 and the first electronic device 201. For example, end-to-end encryption may be used to encrypt messages exchanged between the server 208 and the first electronic device 201. The key information may include a secret key and/or an initial vector (IV). For example, the secret key and/or the initial vector (IV) may include a 32-bit value or a 16-bit value. The processor 310 may store and manage secret key and/or initial vector (IV) information shared with the first electronic device 201. For example, the processor 310 may store an international mobile equipment identity (IMEI) of the first electronic device 201 and shared secret key and/or initial vector (IV) information so as to be associated with each other.

TABLE 2

| IMEI | Secret key | IV |
|---|---|---|
| IMEI: 1234567890ABCDE | 597133743677397A24432646294A404E635 266556A586E327234753778214125 | 3777217A244326462 94A404E63526655 |
| IMEI: ABCDE3274547890 | 4D635166546A576D5A7134743777217A25 432A462D4A614E645267556B587032 | 357538782F413F442 8472B4B62506553 |

Referring to Table 2 above, the processor 310 may store a secret key (597133743677397A24432646294A404E635266556A586 E327234753778214125) and an IV (3777217A24432646294A404E63526655) shared with an electronic device corresponding to an IMEI: 1234567890ABCDE so as to be associated with each other, and store a secret key (4D635166546A576D5A7134743777217A25432A462D4 A614E645267556B587032) and an IV (357538782F413F4428472B4B62506553) shared with an electronic device corresponding to an IMEL ABCDE 3274547890 so as to be associated with each other. In addition to this, secret key and/or initial vector (IV) information corresponding to other IMEIs may also be stored.

In operation 420, the processor 310 may receive a virtual ID and location information based on key information from the second electronic device 204. The second electronic device 204 may receive a loss-related advertising packet from the first electronic device 201, obtain a virtual ID of the first electronic device 201 produce using the key information in the first electronic device 201 from the advertising packet, and obtain location information of the first electronic device 201.

Upon receiving a loss-related advertising packet, the second electronic device 204 may obtain location information of the first electronic device 201, based on the location information of the second electronic device 204. The second electronic device 204, when receiving a loss-related advertising packet, may obtain location information of the first electronic device 201 included in the loss-related advertising packet or, when receiving a loss-related advertising packet, separately receive location information of the first electronic device 201 from the first electronic device 201. For example, the first electronic device 201 may obtain location information of the first electronic device 201, based on a sensor (e.g., a location sensor) included in the first electronic device 201, or obtain location information of the first electronic device 201, based on location information (e.g., global positioning system (GPS) information) received from another electronic device (e.g., a parent terminal), before entering a lost mode (e.g., the state in which communication is disconnected from the parent terminal or the state in which communication is disconnected from the network 299), and may transmit the location information to the second electronic device 204. For example, the first electronic device 201 may include the location information of the first electronic device 201 in the loss-related advertising packet and transmit the location information, or may transmit the location information of the first electronic device 201 separately from transmission of the loss-related advertising packet. The second electronic device 204 may transmit the obtained virtual ID and location information based on the key information to the server 208. The processor 310 may receive the virtual ID and location information based on the key information transmitted from the second electronic device 204 through the communication module 320.

In operation 430, the processor 310 may identify (or find) the first electronic device 201, based on the virtual ID and location information based on the key information received from the second electronic device 204, and obtain (or identify) the location of the first electronic device 201. For example, the processor 310 may use a data base (DB) table previously provided with respect to virtual IDs. An example of the DB table is shown in Table 3 below.

TABLE 3

| International mobile equipment identity (IMEI) | Virtual ID | Index |
|---|---|---|
| IMEI: 1234567890ABCDE | 87c04b16130dafd6f365 | 0 |
| IMEI: 1234567890ABCDE | 41ddc9d73404e0776baa | 1 |
| IMEI: 1234567890ABCDE | 566423d9ba48105d53d0 | 2 |
| . . . | . . . | . . . |
| IMEI: 1234567890ABCDE | XXXXXXXXXXXXXXXXXXXX | N |

Referring to Table 3 above, the processor 310 may obtain and store a plurality of virtual IDs (e.g., N virtual IDs) for the IMEIs of the first electronic device 201, based on the secret key and/or initial vector shared with the first electronic device 201. For example, N virtual IDs may be obtained through Equation 1 below.

$$IDn = Sha256(secret + IV + indexN) \qquad \text{Equation 1}$$

According to Equation 1 above, the processor 310 may put a value of indexN (number 0 to N–1) behind a value (hash value) obtained by combining (secret+IV) the secret key and the initial vector, thereby extending the hash value. For example, if secret key and initial vector values are secret (597133743677397A24432646294A404E635266556A58 6E3272347537782141 25) and IV(3777217A24432646294A404E63526655), the processor 310 may append a value of indexN (number 0 to N–1) to a combination value (597133743677397A24432646294A404E635266556A586 E327234753778214125377 7217A24432646294A404E63526655) of secret+IV, thereby performing sha256, and a 256-bit hash code (46ae864fd4cb7b3374fd2d292726559e) obtained as a result thereof may be a virtual ID. The processor 310 may retrieve a virtual ID based on the key information received from the second electronic device 204 from a DB table provisioned in advance for the virtual IDs, identify an IMEI corresponding to the retrieved virtual ID, thereby identifying the first electronic device 201, and identify that the location information received from the second electronic device 204 is the location information of the first electronic device 201.

In operation 440, the processor 310 may produce a remote control function request message for the first electronic device 201 and encrypt the remote control function request message using the key information. A remote control function may include a remote locking function or an initialization function. For example, the processor 310 may encrypt the remote control function request message as shown in Table 4.

TABLE 4

| Remote control function request message | Encrypted remote control function request message |
|---|---|
| {"requestId":"7206716516405508 29","operation":"Lock","oprnStat usCode":"1000", "data":{ "message":"Lost cell phone. Please contact me at phone number below", "tel":"000-0000-0000", "pwd":"fEqNCco3Yq9h5ZuglD3 CZJT4lBs=" } } | {"privateId":"87c04b16130dafd6f365", "remoteOperation":"EkRVkS+P8N2cWG DpxkZROoiYg0WgepdcNoob3TGEJbwsE JXSYfFDQq8eFbd/USHl+kRpYjIBZOHG ZPYbNF+7tCMMcOmAWcIin5WskUKG ikBGE1Pf+FthZQkWoyVl6efJS9gSlJ33/x 9a+UqywSm2DEYRR2cEfX8KDWpeSL7 uFagDVAL/E6eN1+7Vn+6BugLe/K6RFT cIke9Z/EufoTHh21c5CfnGM+WdFLYlJ3 WmmPbCxZwnG3GPvb+ymHGP+Dl0S8 45rKLAuwMB4HqkijeYs6jAgcrHxXMbo diqG1zKXbwmi5i3N/zM/7uAHfkC1o/igg GImCzBM4kVV/afWmck9w=="} |

Referring to Table 4 above, a remote control function request message according to an embodiment may include requestId and data. RequestId may include a unique ID for the request, and data may include data necessary for executing operations. For example, the unique ID may be an ID of a lost first electronic device 201, and the data required to execute operations may include data for controlling display of messages such as "Lost cell phone. Please contact me at phone number below" and "tel":"000-0000-0000". An encrypted remote control function request message according to an embodiment may include privateId and remoteOperation. PrivateId may be a virtual ID obtained by encrypting a unique ID using key information. RemoteOperation may include data obtained by encrypt data corresponding to a remote control function request command of a user using the secret and IV of the first electronic device 201.

In operation 450, the processor 310 may transmit the encrypted remote control function request message to the second electronic device 204. The second electronic device 204 may establish a communication connection with the first electronic device 201, based on reception of the encrypted remote control function request message, and transmit the encrypted remote control function request message to the first electronic device 201 through communication. The processor 310 may perform a communication connection based on an IoT communication standard with the first electronic device 201 through the communication module 320. For example, the processor 310 may perform a communication connection based on BLE (or Bluetooth), Zigbee, or Thread. A remote control function may be executed in the first electronic device 201 using the encrypted remote control function request message, and an encrypted remote control function execution result message may be received by the second electronic device 204.

In operation 460, the processor 310 may receive an encrypted remote control function processing (or execution) result message from the second electronic device 204. For example, the processor 310, based on reception of an encrypted remote control function execution result message, may decrypt the encrypted remote control function execution result message and produce and/or provide (or display) information notifying the user (or user's electronic device) of a result of executing the remote control function using the decrypted remote control function execution result message.

A method for remote control of an electronic device according to an embodiment of the disclosure may include obtaining key information associated with a first electronic device. The method may include receiving a virtual ID and location information based on the key information from a second electronic device. The method may include identifying the first electronic device corresponding to the virtual ID using the key information. The method may include, when a remote control function request message for the first electronic device exists, encrypting the remote control function request message using the key information and transmitting the encrypted remote control function request message to the second electronic device. The method may include receiving, from the second electronic device, a remote control function request processing result message encrypted in the first electronic device in response to the encrypted remote control function request message. The method may include decrypting the encrypted remote control function request processing result message using the key information to obtain a remote control function request processing result.

The method may include generating the key information associated with the first electronic device and storing the key information in the memory, based on lost service registration for the first electronic device, and transmitting the key information associated with the first electronic device to the first electronic device.

In the method, the key information may include a secret key and an initial vector (IV).

The method may include generating a plurality of virtual IDs for device information of the first electronic device using the key information, storing the generated plurality of virtual IDs in the memory, and identifying the received virtual ID from among the plurality of virtual IDs.

In the method, the device information of the first electronic device may include an IMEI.

In the method, a remote control function requested by the remote control function request message may be a locking function or an initialization function.

Figure 5:
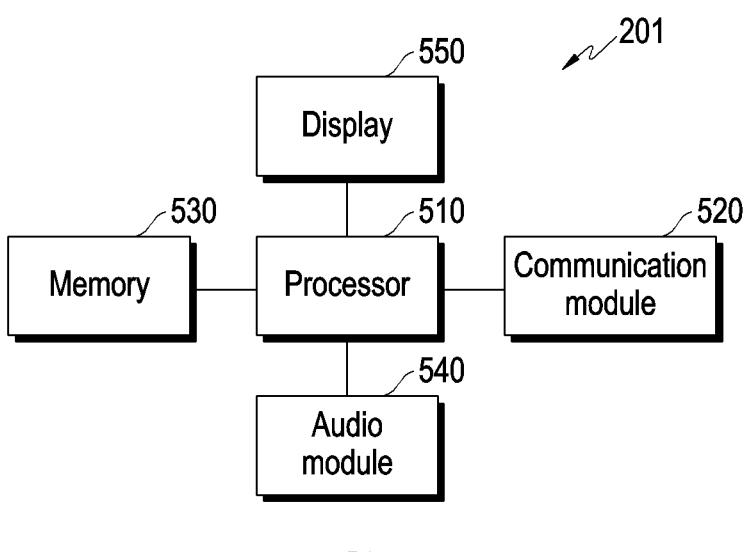
FIG. 5 is a diagram illustrating the configuration of a first electronic device according to an embodiment of the disclosure.

FIG. 5 is a diagram illustrating the configuration of a first electronic device according to an embodiment of the disclosure.

Referring to FIG. 5, the first electronic device 201 may be a portable electronic device such as a mobile phone (e.g., a smartphone), a location tracker, a digital pen, a smart watch, or earbuds. The first electronic device 201 may include a processor 510 (e.g., the processor 120 in FIG. 1), a communication module 520 (e.g., the communication module 190 in FIG. 1), a memory 530 (e.g., the memory 130 in FIG. 1), an audio module 540 (e.g., the audio module 170 in FIG. 1), and a display 550 (e.g., the display module 160 in FIG.

1). The first electronic device 201 according to embodiments of the disclosure is not limited thereto and may be configured to further include various elements or exclude some of the elements. The first electronic device 201 may further include all or part of the components of the electronic device 101 shown in FIG. 1.

The processor 510 may share key information with the server 208 when the first electronic device 201 is registered in the server 208 as a device that is subject to location acquisition and remote control when the first electronic device 201 is lost. For example, when the first electronic device 201 is registered in the server 208 as a device that is subject to location acquisition and remote control when the first electronic device 201 is lost, the processor 510 may receive key information provided from the server 208 and store the same in the memory 530.

The processor 510 may identify a lost state of the first electronic device 201. The processor 510 may identify that the first electronic device 201 is in a lost state when a specified time elapses after the communication using the communication module 520 of the first electronic device 201 is disconnected. The first electronic device 201 may directly communicate with the server 208 using the communication module 520, communicate with a parent terminal (not shown) after connecting to the parent terminal using the communication module 520, or communicate with the server 208 through the parent terminal after connecting to the parent terminal. In the case of direct communication with the server 208, if the first electronic device 201 fails to establish a communication connection with the server 208 despite an attempt to directly communicate with the server 208 using the communication module 520, the processor 510 may identify that the communication of the first electronic device 201 using the communication module 520 is disconnected. In the case of communication with the server 208 through the parent terminal, if the first electronic device 201 fails to establish a communication connection with the parent terminal despite an attempt to communicate with the parent terminal using the communication module 520, the processor 510 may identify that the communication of the first electronic device 201 using the communication module 520 is disconnected. If communication connection with the parent terminal using the communication module 520 fails, the processor 510 may identify that the communication is disconnected from the parent terminal.

In response to identifying that the first electronic device 201 is in a lost state (e.g., the state in which communication is disconnected from the parent terminal or the state in which communication is disconnected from the network 299), the processor 510 may operate in a lost mode. When operating in the lost mode, the processor 510 according to an embodiment may obtain (or produce) a virtual ID (e.g., privateId) corresponding to an ID (e.g., IMEI) of the first electronic device 201 using key information shared between the first electronic device 201 and the server 208. The virtual ID may vary according to rules agreed between the first electronic device 201 and the server 208 (or stored in each of the first electronic device 201 and the server 208) at specified time intervals. The processor 510 may produce a loss-related advertising packet (e.g., a loss advertising packet) including a virtual ID when operating in the lost mode. The processor 510 may broadcast the loss-related advertising packet through the communication module 520 in the lost mode. For example, the first electronic device 201 may broadcast the loss-related advertising packet in the lost mode through BLE communication or Bluetooth communication. The processor 510 may allow a BLE connection (e.g., a connection using a general attribute profile (GATT)) with an external device in the lost mode.

The loss-related advertising packet may be received by a second electronic device 204 around the first electronic device 201. As the loss-related advertising packet is received by the second electronic device 204 around the first electronic device 201, the second electronic device 204 may obtain a virtual ID from the loss-related advertising packet and obtain location information of the first electronic device 201. The second electronic device 204 may obtain location information of the first electronic device 201, based on location information of the second electronic device 204, upon receiving the loss-related advertising packet. The second electronic device 204, upon receiving the loss-related advertising packet, may obtain location information of the first electronic device 201 included in the loss-related advertising packet or, upon receiving the loss-related advertising packet, may separately receive the location information of the first electronic device 201 from the first electronic device 201. For example, the first electronic device 201 may obtain location information of the first electronic device 201, based on a sensor (e.g., a location sensor) included in the first electronic device 201, or obtain location information of the first electronic device 201, based on location information (e.g., GPS information) received from another electronic device (e.g., a parent terminal), before entering the lost mode, and may transmit the location information to the second electronic device 204. For example, the first electronic device 201 may include the location information of the first electronic device 201 in the loss-related advertising packet and transmit the loss-related advertisement packet including the location information, or may transmit the location information of the first electronic device 201 separately from transmission of the loss-related advertising packet.

The virtual ID and location information obtained by the second electronic device 204 may be transmitted to the server 208. The second electronic device 204 may receive an encrypted remote control function request message for the first electronic device 201 corresponding to the virtual ID from the server 208. Upon reception of the encrypted remote control function request message, the second electronic device 204 may transmit a communication connection (e.g., BLE connection) request to the first electronic device 201 in order to transmit the encrypted remote control function request message. In an embodiment, the communication connection may be a communication connection based on an IoT communication standard. For example, the communication connection may be a communication connection based on BLE (or Bluetooth), Zigbee, or Thread. The processor 510 may establish a BLE connection with the second electronic device 204 using the GATT through the communication module 520, based on the BLE connection request from the second electronic device 204. The processor 510 may receive an encrypted remote control function request message from the second electronic device 204 through the BLE connection. The processor 510 may decrypt the encrypted remote control function request message using key information shared with the server 208 to obtain a decrypted remote control function request message. The processor 510 may execute a requested remote control function (e.g., a locking function or an initialization function), based on remote control information (or commands or data) included in the remote control function request message. The processor 510 may produce a remote control function request processing result message after executing a remote control function corresponding to the remote control function request message, encrypt the produced remote control function request processing result message using key information, and transmit the encrypted remote control function request processing result message to the second electronic device 204 through the BLE connection. The encrypted remote control function request processing result message may be transmitted to the server 208 through the second electronic device 204.

The processor 510 may store the virtual ID (requestId) and a processing state of the requested remote control function (e.g., a locking function or an initialization function) using the virtual ID in the memory 530 and, if a remote control function request message for the same virtual ID is received, transmit a response indicating "refusal", instead of executing the requested remote control function, to the second electronic device 204. Accordingly, it is possible to prevent a requested remote control function from being repeatedly executed by the first electronic device 201. When receiving a response indicating "refusal", the second electronic device 204 may stop the operation related to the location report.

The communication module 520 may support establishment of a direct (e.g., wired) communication channel or wireless communication channel between the server 208 and the first electronic device 201, and communication through the established communication channel. The communication module 520 may support establishment of a communication channel based on an IoT communication standard (e.g., BLE (or Bluetooth), Zigbee, or Thread) between the first electronic device 201 and the second electronic device 204, and communication through the established communication channel.

The memory 530 may store a variety of data and information used by the processor 510 and/or the communication module 520. The data may include, for example, software (e.g., programs) and input data or output data for commands related thereto. The memory 530 may include volatile memory or non-volatile memory. The memory 530 may store instructions for processing operations performed by the processor 510.

The audio module 540 may convert sound into an electrical signal or vice versa. The audio module 540 may obtain sound or output sound through a speaker or a headphone connected through communication.

The display 550 may visually provide information to the outside (e.g., a user) of the first electronic device 201. The display 550 may include, for example, a display, a hologram device, or a projector and a control circuit for controlling the device. The display 550 may include a touch sensor configured to sense a touch or a pressure sensor configured to measure the intensity of force produced by the touch.

An electronic device (e.g., the first electronic device 201) according to an embodiment of the disclosure may include a communication module (520 in FIG. 5), a memory (530 in FIG. 5), and a processor (510 in FIG. 5). The processor may broadcast an advertising packet including a virtual ID corresponding to the electronic device based on a specified time elapsed after communication with an external electronic device using the communication module is disconnected. The processor may establish a communication connection with the external electronic device, based on a communication connection request received from the external electronic device in response to the advertising packet. The processor may receive an encrypted remote control function request message from the external electronic device through the communication connection. The processor may decrypt the encrypted remote control function request message using key information related to the virtual ID and perform a remote control function based on the decrypted remote control function request message.

The processor may generate a remote control function request processing result message for the requested remote control function, encrypt the remote control function request processing result message using the key information, and transmit the encrypted remote control function request processing result message to the external electronic device.

An account of the electronic device may be different from an account of the external electronic device.

The processor, based on lost service registration for the electronic device in an external server, may receive the key information from the external server and store the key information in the memory.

The key information may include a secret key and an initial vector (IV).

The virtual ID may be obtained based on an IMEI of the electronic device.

FIG. 6 is a flowchart illustrating the operation of a first electronic device according to an embodiment of the disclosure.

Referring to FIG. 6, the processor 510 of the first electronic device 201 may perform at least one of operations 610 to 660.

In operation 610, the processor 510 may identify a lost state of the first electronic device 201. The processor 510 may identify that the first electronic device 201 is in a lost state when a specified time elapses after communication using the communication module 520 of the first electronic device 201 is disconnected. For example, the first electronic device 201 may directly communicate with the server 208 using the communication module 520, communicate with a parent terminal (not shown) after connecting to the parent terminal using the communication module 520, or communicate with the server 208 through the parent terminal after connecting to the parent terminal. If the first electronic device 201 fails to establish a communication connection with the server 208 despite an attempt to directly communicate with the server 208 using the communication module 520, the processor 510 may identify that the communication of the first electronic device 201 using the communication module 520 is disconnected. If the first electronic device 201 fails to establish a communication connection with the parent terminal despite an attempt to communicate with the parent terminal using the communication module 520, the processor 510 may identify that the communication of the first electronic device 201 using the communication module 520 is disconnected.

The processor 510 may operate in a lost mode, based on identifying that the first electronic device 201 is in the lost state. For example, when operating in the lost mode, the first electronic device 201 may operate in a low-power mode.

In operation 620, the processor 510 may broadcast a loss-related advertising packet. When operating in the lost mode, the processor 510 may obtain a virtual ID (e.g., privateId) corresponding to an ID (e.g., IMEI) of the first electronic device 201 using key information shared between the first electronic device 201 and the server 208.

The virtual ID may vary according to rules agreed between the first electronic device 201 and the server 208 (or stored in each of the first electronic device 201 and the server 208) at specified time intervals. The processor 510 may produce a loss-related advertising packet (e.g., a loss advertising packet) including the virtual ID when operating in the lost mode. The processor 510 may broadcast the loss-related advertising packet in the lost mode. For example, the first electronic device 201 may broadcast the loss-related advertising packet in a specified cycle during a specified period of time or by a request from an external device (e.g., the server 208). The processor 510 may allow a BLE connection (e.g., a connection using a general attribute profile (GATT)) with an external device in the lost mode. The loss-related advertising packet may be received by a second electronic device 204 around the first electronic device 201. As the loss-related advertising packet is received by the second electronic device 204 around the first electronic device 201, the second electronic device 204 may obtain a virtual ID from the loss-related advertising packet and obtain location information of the first electronic device 201. The virtual ID and location information obtained by the second electronic device 204 may be transmitted to the server 208. The second electronic device 204 may receive an encrypted remote control function request message for the first electronic device 201 corresponding to the virtual ID from the server 208. Based on reception of the encrypted remote control function request message, the second electronic device 204 may transmit a communication connection (e.g., BLE connection) request to the first electronic device 201 in order to transmit the encrypted remote control function request message. According to an embodiment of the disclosure, the BLE connection may include a connection using GATT.

In operation 630, the processor 510 may establish a communication connection with the second electronic device 204 through the communication module 520, based on the communication connection request from the second electronic device 204. The processor 510 may perform a communication connection with the first electronic device 201, based on the IoT communication standard. For example, the processor 510 may establish a BLE (or Bluetooth), Zigbee, or Thread communication connection with the second electronic device 204 through the communication module 520 according to the request based on BLE (or Bluetooth), Zigbee, or Thread from the second electronic device 204. An example of a BLE connection will be described in the following description.

In operation 640, the processor 510 may receive an encrypted remote control function request message from the second electronic device 204 through a BLE connection.

In operation 650, the processor 510 may remotely execute a requested function using the encrypted remote control function request message. The processor 510 may decrypt the encrypted remote control function request message using key information shared with the server 208 and obtain a decrypted remote control function request message. The processor 510 may execute a requested remote control function (e.g., a locking function or an initialization function), based on remote control information (or commands or data) included in the remote control function request message. If an error occurs in the process of decoding the encrypted remote control function request message or if decryption is impossible, the processor 510 may transmit an error response message to the second electronic device 204 and terminate the BLE connection with the second electronic device 204.

In operation 660, the processor 510 may produce an encrypted remote control function request processing result message and transmit the same to the second electronic device 204. The processor 510 may produce a remote control function request processing result message after executing a remote control function corresponding to the remote control function request message, encrypt the produced remote control function request processing result message using key information, and transmit the encrypted remote control function request processing result message to the second electronic device 204 through the BLE connection. The encrypted remote control function request processing result message may be transmitted to the server 208 through the second electronic device 204.

A method of executing a remote request function in an electronic device according to an embodiment of the disclosure may include broadcasting an advertising packet including a virtual ID corresponding to the electronic device based on a specified time elapsed after communication with an external electronic device using the communication module of the electronic device is disconnected. The method may include establishing a communication connection with the external electronic device, based on a communication connection request received from the external electronic device in response to the advertising packet. The method may include receiving an encrypted remote control function request message from the external electronic device through the communication connection. The method may include decrypting the encrypted remote control function request message using key information related to the virtual ID. The method may include performing a remote control function requested by the decrypted remote control function request message.

The method may include generating a remote control function request processing result message for the requested remote control function. The method may include encrypting the remote control function request processing result message using the key information. The method may include transmitting the encrypted remote control function request processing result message to the external electronic device.

FIG. 7 is a diagram illustrating the configuration of a second electronic device that assists in locating and remotely controlling a first electronic device according to an embodiment of the disclosure.

Referring to FIG. 7, the second electronic device 204 may be an electronic device capable of being connected to the server 208 through the network 299. The second electronic device 204 may include a processor 710, a communication module 720, and a memory 730. The second electronic device 204 according to an embodiment is not limited thereto and may be configured to further include various elements or exclude some of the elements. The second electronic device 204 may further include entirety or some of the electronic device 101 shown in FIG. 1.

The processor 710 may receive a loss-related advertising packet broadcast from a nearby first electronic device 201 through the communication module 720. The processor 710 may perform a scan (e.g., BLE scan) operation for receiving a loss-related advertising packet (e.g., an advertising packet in a specified format) in a predetermined cycle or by a request from the outside (e.g., the server 208).

For example, the loss-related advertising packet may include a virtual ID of the first electronic device 201. The processor 710 may obtain a virtual ID included in the loss-related advertising packet.

The processor 710 may identify whether or not the received loss-related advertising packet is a previously processed loss-related advertising packet. For example, the processor 710 may identify whether or not the received advertising packet has the same virtual ID as the previously received and processed advertising packet. If the received loss-related advertising packet is a previously processed loss-related advertising packet, the processor 710 may ignore the received loss-related advertising packet. For example, the processor 710 may store previously processed loss-related advertising packets and, if a new loss-related advertising packet is received, compare a virtual ID included in the received loss-related advertising packet with virtual IDs included in the previously processed loss-related advertising packets and, if they are the same, ignore the newly received loss-related advertising packet.

If the received loss-related advertising packet is not a previously processed loss-related advertising packet, the processor 710 may obtain location information of the first electronic device 201 that broadcast the loss-related advertising packet. For example, the processor 710 may measure (or obtain) the location of the first electronic device 201 using the strength of a received advertising packet signal and/or a sensor.

The processor 710 may measure (or obtain) the location of the first electronic device 201, based on the location of the second electronic device 204 that received the loss-related advertising packet. Upon receiving the loss-related advertising packet, the processor 710 may obtain location information of the first electronic device 201, based on location information of the second electronic device 204. The processor 710, when receiving a loss-related advertising packet, may obtain location information of the first electronic device 201 included in the loss-related advertising packet or, when receiving a loss-related advertising packet, obtain location information of the first electronic device 201 separately received the first electronic device 201. For example, the first electronic device 201 may obtain location information of the first electronic device 201, based on a sensor (e.g., a location sensor) included in the first electronic device 201, or obtain location information of the first electronic device 201, based on location information (e.g., GPS information) received from another electronic device (e.g., a parent terminal), before entering a lost mode, and may transmit the location information to the second electronic device 204. For example, the first electronic device 201 may include the location information of the first electronic device 201 in the loss-related advertising packet and transmit the same, or may transmit the location information of the first electronic device 201 separately from transmission of the loss-related advertising packet.

The processor 710 may transmit the virtual ID and location information to the server 208 through the network 299 using the communication module 720.

The processor 710 may transmit a location report including the virtual ID and location information to the server 208. For example, the processor 710 may transmit a location report shown in Table 5 below to the server 208.

TABLE 5

```
{
"privateId":"87c04b16130dafd6f365","clientVersion":"1.2.2.8",
"serviceData":"AFOjsXZ9xGNS5mG2akl=",
"geolocation":{
"gpsUtcDt":"2022-05-04 01:25:41","coupled":false,
"method":"wifi",
"accuracy":20.80699920654297,
"speed":0,"rssi":−77,"latitude":37.2589016,"longitude":127.0560077}
}
}
```

Referring to Table 5 above, the location report may include information such as "privateId "87c04b16130dafd6f365"" as a virtual ID and ""geolocation":{"gpsUtcDt":"2022-05-04 01:25:41","coupled":false, "method":"wifi",
"accuracy":20.80699920654297,
"speed":0,"rssi": −77,"latitude":37.2589016,"longitude": 127.05600771"
as location information.

The location report may include the received advertising packet itself. When obtaining a virtual ID, the second electronic device 204 may store, in the memory 730, a MAC address of an electronic device (e.g., the first electronic device 201) that provided the virtual ID.

TABLE 6

| Virtual ID | Mac address |
| --- | --- |
| 87c04b16130dafd6f365 | 3D:45:AB:80 |
| 71270a330b48fa5e1ebf | A3:59:C9:34 |

Referring to Table 6 above, the second electronic device 204 and store virtual IDs and MAC addresses to be distinguished such that a virtual ID of 87c04b16130dafd6f365 is received from a MAC address of 3D:45:AB:80 and such that a virtual ID of 71270a330b48fa5e1ebf is received from a MAC address of A3:59:C9:34. The MAC address corresponding to the virtual ID may be used by the second electronic device 204 to establish a BLE connection (e.g., connection using GATT). In response to reception of the virtual ID and location information, an encrypted remote control function request message for the first electronic device 201 corresponding to the virtual ID may be transmitted from the server 208 to the second electronic device 204. The processor 710 may receive a response to the transmission of the virtual ID and location information. The processor 710 may decode (or parse) a message included in the response to the transmission of the virtual ID and location information, thereby identifying whether or not a remote control function request message is included therein. If a remote control function request message is included in the response to the transmission of the virtual ID and location information, the processor 710 may identify an encrypted remote control function request message. The processor 710, based on the encrypted remote control function request message, may request a communication connection to the first electronic device 201 and perform a communication connection with the first electronic device 201. The processor 710 may request a communication connection based on the IoT communication standard to the first electronic device 201. For example, the processor 710 may request a communication connection based on BLE (or Bluetooth), Zigbee, or Thread. An example of a BLE connection may be described in this document. The processor 710 may transmit an encrypted remote control function request message to the first electronic device 201 through a BLE communication connection with the first electronic device 201. The processor 710 may receive an encrypted remote control function request processing result message from the first electronic device 201. The processor 710 may transmit the encrypted remote control function request processing result message to the server 208.

The communication module 720 may support establishment of a direct (e.g., wired) communication channel or wireless communication channel between the server 208 and the second electronic device 204, and communication through the established communication channel. The communication module 720 may support establishment of a BLE (or Bluetooth), Zigbee, or Thread communication channel between the first electronic device 201 and the second electronic device 204, and communication through the established communication channel.

The memory 730 may store a variety of data and information used by the processor 710 and/or the communication module 720. The data may include, for example, software (e.g., programs) and input data or output data for commands related thereto. The memory 730 may include volatile memory or non-volatile memory. The memory 730 according to an embodiment may store instructions for processing operations performed by the processor 710.

FIG. 8 is a flowchart illustrating the operation of a second electronic device that assists in locating and remotely controlling a first electronic device according to an embodiment of the disclosure.

Referring to FIG. 8, the processor 710 of the second electronic device 204 according to an embodiment may perform at least one of operations 810 to 860.

In operation 810, the processor 710 may receive a loss-related advertising packet broadcast from a nearby first electronic device 201. For example, the loss-related advertising packet may include a virtual ID of the first electronic device 201 produced using key information.

In operation 820, the processor 710 may obtain a virtual ID included in the loss-related advertising packet and obtain location information of one first electronic device 201 that broadcast the loss-related advertising packet. For example, the processor 710 may measure (or obtain) the location of the first electronic device 201 using the strength of a received advertising packet signal and/or a sensor. The processor 710 may measure (or obtain) the location of the first electronic device 201, based on the location of the second electronic device 204 that received the loss-related advertising packet. The second electronic device 204 may obtain location information of the first electronic device 201, based on its own location information when receiving the loss-related advertising packet. The second electronic device 204, upon receiving the loss-related advertising packet, may obtain location information of the first electronic device 201 included in the loss-related advertising packet or, upon receiving the loss-related advertising packet, may separately receive the location information of the first electronic device 201 from the first electronic device 201. For example, the first electronic device 201 may obtain location information of the first electronic device 201, based on a sensor (e.g., a location sensor) included in the first electronic device 201, or obtain location information of the first electronic device 201, based on location information (e.g., GPS information) received from another electronic device (e.g., a parent terminal), before entering the lost mode, and may transmit the location information to the second electronic device 204. For example, the first electronic device 201 may include the location information of the first electronic device 201 in the loss-related advertising packet and transmit the same, or may transmit the location information of the first electronic device 201 separately from transmission of the loss-related advertising packet.

In operation 830, the processor 710 may transmit the virtual ID and location information to the server 208 through the network 299 using the communication module 720. In response to reception of the virtual ID and location information, an encrypted remote control function request message for the first electronic device 201 corresponding to the virtual ID may be transmitted from the server 208 to the second electronic device 204.

In operation 840, in response to transmission of the virtual ID and location information, the processor 710 according to an embodiment may request a BLE connection (e.g., communication connection using the GATT) to the first electronic device 201, based on the reception of an encrypted remote control function request message from the server 108, and perform a BLE communication connection with the first electronic device 201. For example, if an encrypted remote control function request message is received from the server 108 in response to transmission of the virtual ID and location information, the processor 710 may identify a MAC address stored based on the virtual ID and attempt to establish a BLE connection using the MAC address.

In operation 850, the processor 710 may transmit an encrypted remote control function request message to the first electronic device 201 through a BLE communication connection with the first electronic device 201 and receive an encrypted remote control function request processing result message from the first electronic device 201.

In operation 860, the processor 710 may transmit the encrypted remote control function request processing result message to the server 208.

A method for remote control of an electronic device according to an embodiment of the disclosure may include obtaining location information of an external electronic device when an advertising packet including a virtual ID of the external electronic device is received from the external electronic device (e.g., the first electronic device 201). The method may include transmitting the virtual ID and the location information to an external server (e.g., the server 208) and receiving, from the external server, an encrypted remote control function request message in response to the transmission of the virtual ID and the location information. The method may include establishing a Bluetooth-based communication connection with the external electronic device and transmitting the encrypted remote control function request message to the external electronic device through the Bluetooth-based communication connection.

Figure 9:
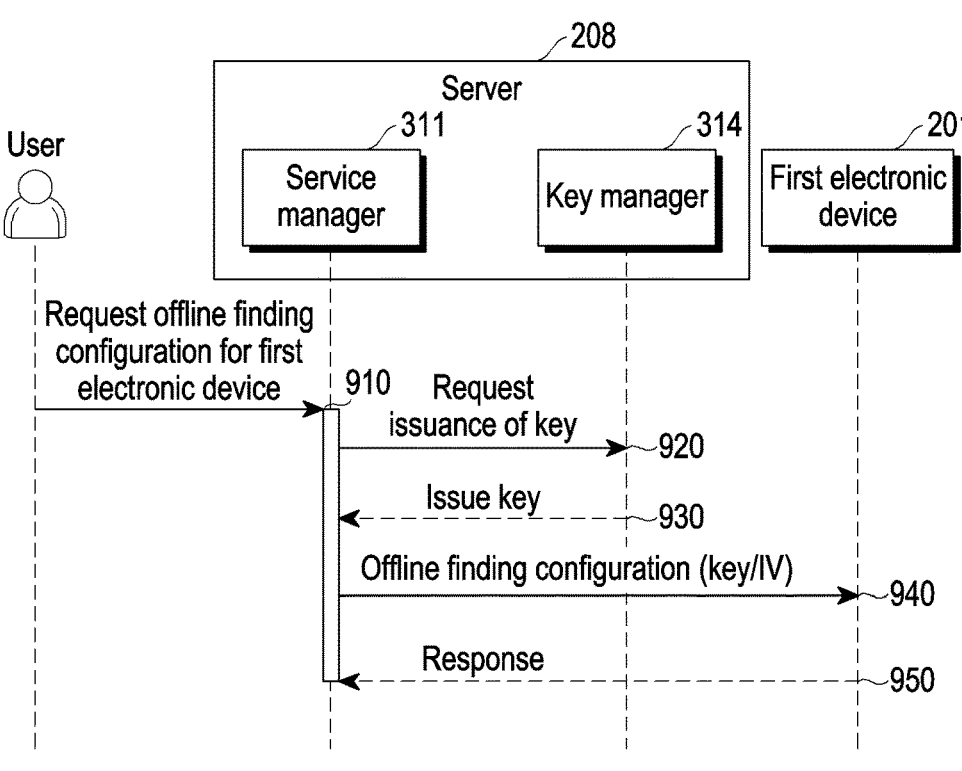
FIG. 9 is a diagram illustrating the operation of a server and a first electronic device, based on an offline finding configuration request for a first electronic device, according to an embodiment of the disclosure.

FIG. 9 is a diagram illustrating the operation of a server and a first electronic device, based on an offline finding configuration request for a first electronic device, according to an embodiment of the disclosure.

Referring to FIG. 9, in operation 910, the service manager 311 of the server 208 may receive or identify an offline finding configuration request for the first electronic device 201 from a user or a user's input device (e.g., an electronic device capable of receiving input from the user). For example, the user may input an offline finding configuration request for the first electronic device 201 through the first electronic device 201 before the first electronic device 201 is lost and cause the first electronic device 201 to transmit the offline finding configuration request for the first electronic device 201 to the server 208, or may input an offline finding configuration request for the first electronic device 201 through an electronic device (e.g., a computer, a laptop PC, a smartphone, or other electronic devices) other than the first electronic device 201 and cause the offline finding configuration request for the first electronic device 201 to be transmitted to the server 208.

In operation 920, the service manager 311 of the server 208 may request the key manager 314 to issue a key, based on the offline finding configuration request for the first electronic device 201.

In operation 930, the key manager 314 of the server 208 may issue (or produce) a key (or key information) to be shared with the first electronic device 201. For example, the key manager 314 may issue a secret key and/or initial vector (IV) corresponding to an IMEI of the first electronic device 201, as key information to be shared with the first electronic device 201. For example, the secret key and/or initial vector (IV) corresponding to the IMEI may be produced, stored, and managed as shown in Table 1 above.

In operation 940, the service manager 311 of the server 208 may transmit an offline finding configuration (key/IV) message including the key information issued by the key manager 314 to the first electronic device 201. The server 208 may directly transmit the offline finding configuration (key/IV) message to the first electronic device 201 in the case where direct communication with the first electronic device 201 is possible using the communication module 320. In the case where the server 208 is connected to another electronic device (e.g., a parent terminal) and is able to communicate with the first electronic device 201 through another electronic device, the server 208 may transmit the offline finding configuration (key/IV) message to the first electronic device 201 through another electronic device.

In operation 950, the first electronic device 201 may transmit a response to reception of the offline finding configuration (key/IV) message including the key information to the server 208. The first electronic device 201 may switch an offline finding service to an on state, based on reception of the offline finding configuration (key/IV) message and continuously identify whether or not it enters a lost state. If the first electronic device 201 is able to directly communicate with the server 208 using the communication module 520, the first electronic device 201 may directly transmit, to the server 208, a response to reception of the offline finding configuration (key/IV) message. If the first electronic device 201 is connected to another electronic device (e.g., a parent terminal) and is able to communicate with the server 208 through another electronic device, the first electronic device 201 may transmit a response to the reception of the offline finding configuration (key/IV) message to the server 208 through another electronic device.

Although it has been described in FIG. 9 that the key information is produced by the server 208 as an example, the key information may be produced by the first electronic device 201 and transmitted to the server 208. In addition, although the offline finding configuration for the first electronic device 201 has been described as an example in FIG. 9, the user may request offline finding configurations for a plurality of electronic devices, respectively, and the server 208 may also issue different keys to the respective electronic devices and individually perform offline finding configuration.

Figure 10:
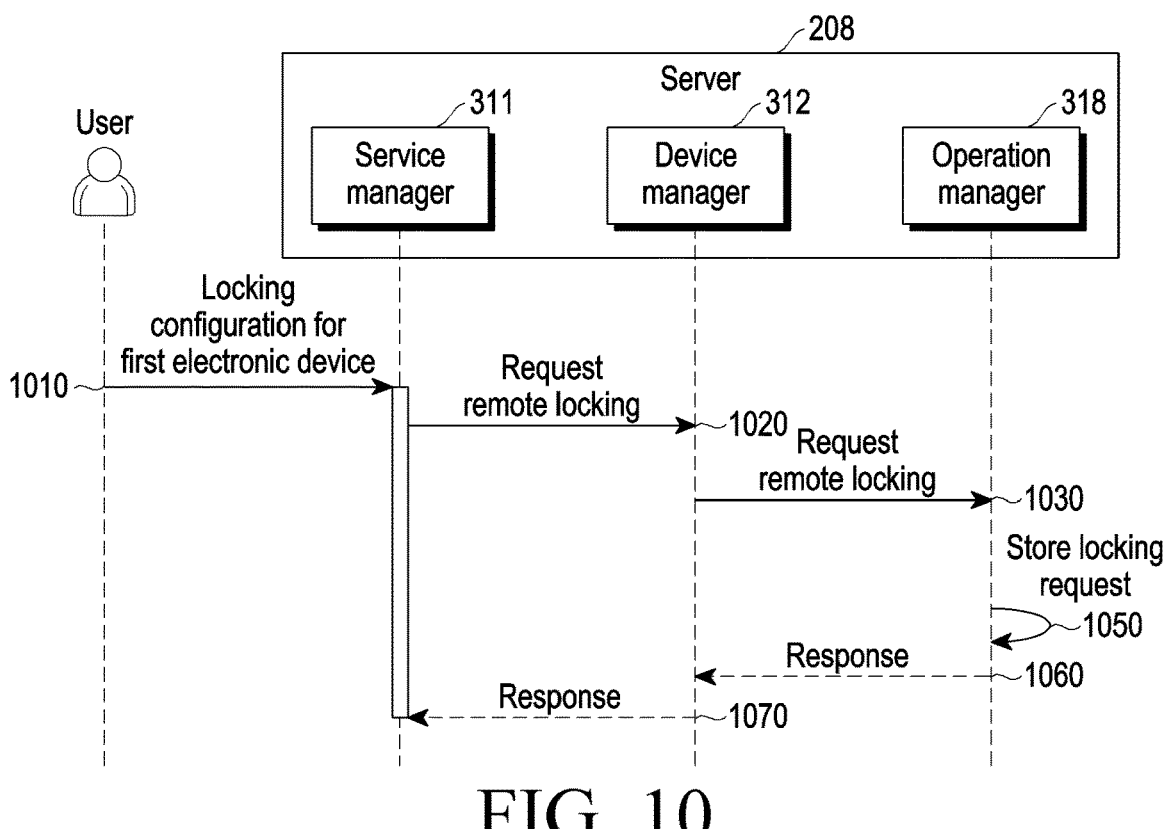
FIG. 10 is an operational diagram illustrating a remote control function request configuration operation related to offline finding of a first electronic device according to an embodiment of the disclosure.

FIG. 10 is an operational diagram illustrating a remote control function configuration operation related to offline finding of a first electronic device according to an embodiment of the disclosure.

Referring to FIG. 10, in operation 1010, the service manager 311 of the server 208 may receive or identify a remote control function (e.g., lock) configuration request for the first electronic device 201 from a user or a user's input device (e.g., an electronic device capable of receiving input from the user). For example, the user may cause a configuration request for automatically executing remote locking through a remote control function when the first electronic device 201 is lost to be transmitted to the server 208 through the first electronic device 201 before the first electronic device 201 is lost, or may input a remote locking request using a remote control function of the first electronic device 201 through another electronic device (e.g., a computer, a laptop PC, a smartphone, or other electronic devices) other than the first electronic device 201 after the first electronic device 201 is lost and cause the remote locking function request to be transmitted to the server 208 through another electronic device.

In operation 1020, the service manager 311 of the server 208 may transmit the remote locking function request for the first electronic device 201 to the device manager 312.

In operation 1030, the device manager 312 of the server 208 may transmit the locking function request to the operation manager 318.

In operation 1050, the operation manager 318 of the server 208 may store the locking function request.

In operation 1060, the operation manager 318 of the server 208 may transmit, to the device manager 312, a response indicating that the locking function request was stored as a remote control function request for the first electronic device 201.

In operation 1070, the device manager 312 of the server 208 may transmit, to the service manager 311, a response indicating that the locking function request was stored as a remote control function request for the first electronic device 201. For example, the service manager 311 may identify whether or not a locking function is requested when the first electronic device 201 is lost, based on the response.

Figure 11:
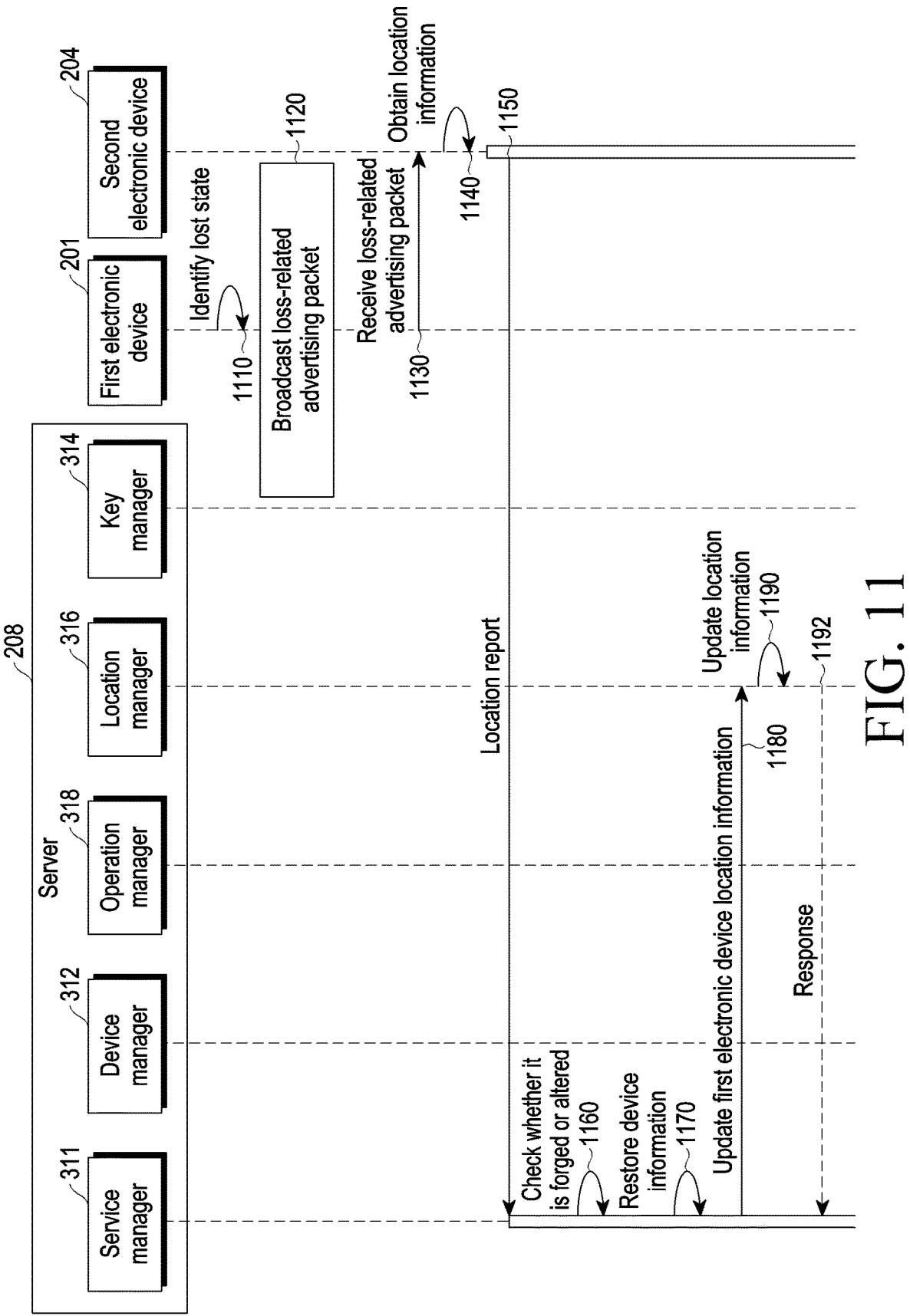
FIG. 11 is an operational diagram illustrating an operation of obtaining location information of a first electronic device according to an embodiment of the disclosure.

FIG. 11 is an operational diagram illustrating an operation of obtaining location information of a first electronic device according to an embodiment of the disclosure.

Referring to FIG. 11, in operation 1110, the first electronic device 201 may identify a lost state. The first electronic device 201 may identify that the first electronic device 201 is in a lost state when a specified time elapses after communication using the communication module 520 is disconnected. For example, the first electronic device 201 may directly communicate with the server 208 using the communication module 520, or may be connected to another electronic device (e.g., a parent terminal (not shown)) using the communication module 520 and then communicate with the server 208 through another electronic device. If the first electronic device 201 fails to establish a communication connection with the server 208 despite an attempt to directly communicate with the server 208 using the communication module 520, the processor 510 may identify that the communication of the first electronic device 201 using the communication module 520 is disconnected. If the first electronic device 201 fails to establish a communication connection with another electronic device (e.g., a parent terminal) despite an attempt to communicate with another electronic device using the communication module 520, then the processor 510 may identify that the communication of the first electronic device 201 using the communication module 520 is disconnected. The first electronic device 201 may operate in a lost mode, based on identifying that it is in the lost state.

In operation 1120, the first electronic device 201 may perform loss-related advertising. For example, the first electronic device 201 may produce, as an obfuscation (or encryption) ID, a virtual ID (e.g., privateId) corresponding to an ID (e.g., IMEI) of the first electronic device 201 using key information (key/IV) shared between the first electronic device 201 and the server 208 and broadcast a loss advertising packet including the virtual ID.

In operation 1130, the second electronic device 204 around the first electronic device 201 may receive the loss-related advertising packet.

In operation 1140, the second electronic device 204 may obtain the virtual ID from the loss-related advertising packet and obtain location information associated with the virtual ID. For example, the second electronic device 204 may measure (or obtain) the location of the first electronic device 201 using the strength of an advertising packet signal received from the first electronic device 201 and/or a sensor.

The processor 710 may measure (or obtain) the location of the first electronic device 201, based on the location of the second electronic device 204 that received the loss-related advertising packet. Upon receiving a loss-related advertising packet, the processor 710 may obtain location information of the first electronic device 201, based on location information of the second electronic device 204. The processor 710, when receiving a loss-related advertising packet, may obtain location information of the first electronic device 201 included in the loss-related advertising packet or, when receiving a loss-related advertising packet, may obtain location information of the first electronic device 201 separately received from the first electronic device 201. For example, the first electronic device 201 may obtain location information of the first electronic device 201, based on a sensor (e.g., a location sensor) included in the first electronic device 201, or obtain location information of the first electronic device 201, based on location information (e.g., GPS information) received from another electronic device (e.g., a parent terminal), before entering a lost mode, and may transmit the location information to the second electronic device 204. For example, the first electronic device 201 may include the location information of the first electronic device 201 in the loss-related advertising packet and transmit the same, or may transmit the location information of the first electronic device 201 separately from transmission of the loss-related advertising packet.

When obtaining a virtual ID, the second electronic device 204 may store a MAC address corresponding to the virtual ID. For example, the MAC address corresponding to the virtual ID may be used by the second electronic device 204 to establish a BLE connection (e.g., connection using GATT).

In operation 1150, the second electronic device 204 according to an embodiment may transmit a location report to the server 208. The service manager 311 of the server 208 according to an embodiment may identify the received location report. The location report according to an embodiment may include a virtual ID and location information. According to an embodiment, the location report may include a received advertising packet and location information.

In operation 1160, the service manager 311 of the server 208 may check whether the location report is forged or altered.

In operation 1170, if it is identified that the location report is not forged or altered, the service manager 311 of the server 208 may restore device information corresponding to the virtual ID. The service manager 311 of the server 208 may retrieve a virtual ID included in the location report from a DB table (e.g., Table 3) previously provided for virtual IDs and restore (e.g., obtain or identify) device information (e.g., an IMEI of the first electronic device 201) corresponding to the retrieved virtual ID.

In operation 1180, the service manager 311 of the server 208 may request the location manager 316 to update location information of the first electronic device. For example, the service manager 311 may provide the IMEI and location information of the first electronic device 201 to the location manager 316.

In operation 1190, the location manager 316 of the server 208 may update location information corresponding to the IMEI of the first electronic device 201.

In operation 1192, the location manager 316 of the server 208 may transmit a response indicating a result of updating location information corresponding to the IMEI of the first electronic device 201 to the service manager 311. The service manager 311 of the server 208 according to an embodiment may identify whether or not a remote control function request message that was requested in relation to the first electronic device 201 exists based on the identification of the IMEI and location information of the first electronic device 201.

Figure 12:
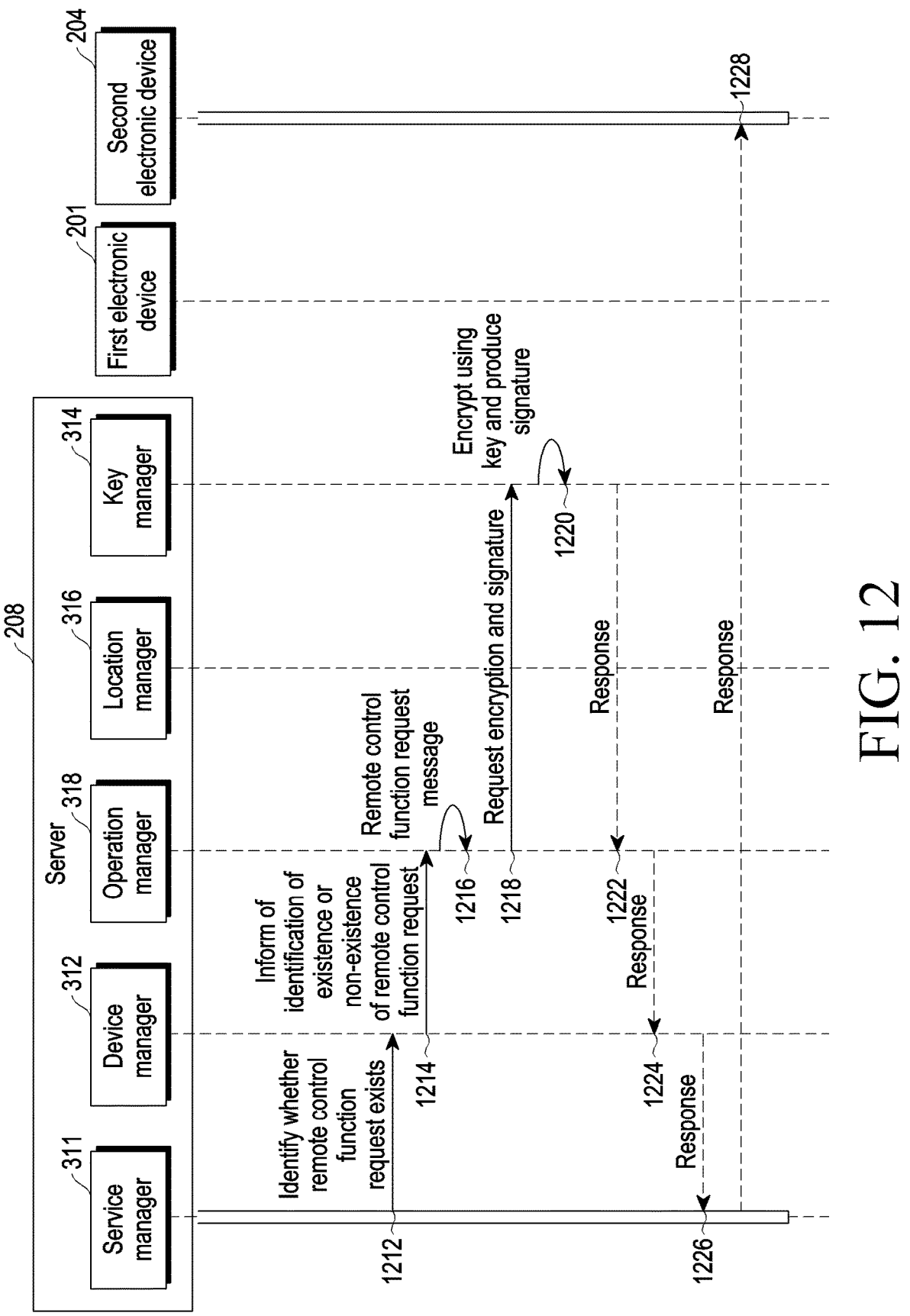
FIG. 12 is an operational diagram illustrating an operation of transmitting a remote control function request message to a first electronic device, based on a remote control function request for the first electronic device, according to an embodiment of the disclosure.

FIG. 12 is an operational diagram illustrating an operation of transmitting a remote control function request message to a first electronic device and receiving a remote control function request execution result according to an embodiment of the disclosure.

Referring to FIG. 12, in operation 1212, the service manager 311 of the server 208 may request the device manager 312 to identify whether or not a remote control function request message of the first electronic device 201 exists. For example, the service manager 311 of the server 208 may request the device manager 312 to identify whether or not a remote control function request exists, based on identification of an IMEI and location information of the first electronic device 201.

In operation 1214, the device manager 312 of the server 208 may inform the operation manager 318 that the remote control function request is identified to exist. For example, the device manager 312 of the server 208 may recognize (or identify) a previously requested remote control function request in relation to the IMEI of the first electronic device 201 and notify the operation manager 318 of the same.

In operation 1216, the operation manager 318 of the server 208 may produce a remote control function request message. For example, the operation manager 318 of the server 208 may produce a remote control function request message including a command, information, or data for the first electronic device 201 to execute the requested remote control function.

In operation 1218, the operation manager 318 of the server 208 may request the key manager 314 to encrypt and sign the produced remote control function request message.

In operation 1220, the key manager 314 of the server 208 may encrypt the remote control function request message using key information previously shared with the first electronic device 201 and produce a signature.

In operation 1222, the key manager 314 of the server 208 may transmit a response including an encrypted remote control function request message and the signature to the operation manager 318.

In operation 1224, the operation manager 318 of the server 208 may transmit the response including an encrypted remote control function request message and a signature to the device manager 312.

In operation 1226, the device manager 312 of the server 208 may transmit the response including the encrypted remote control function request message and the signature to the service manager 311.

In operation 1228, the service manager 311 of the server 208 may transmit the response including the encrypted remote control function request message and the signature to the second electronic device 204. Upon receiving the encrypted remote control function request message, the second electronic device 204 may transmit the encrypted remote control function request message to the first electronic device 201 through a BLE communication connection.

Figure 13:
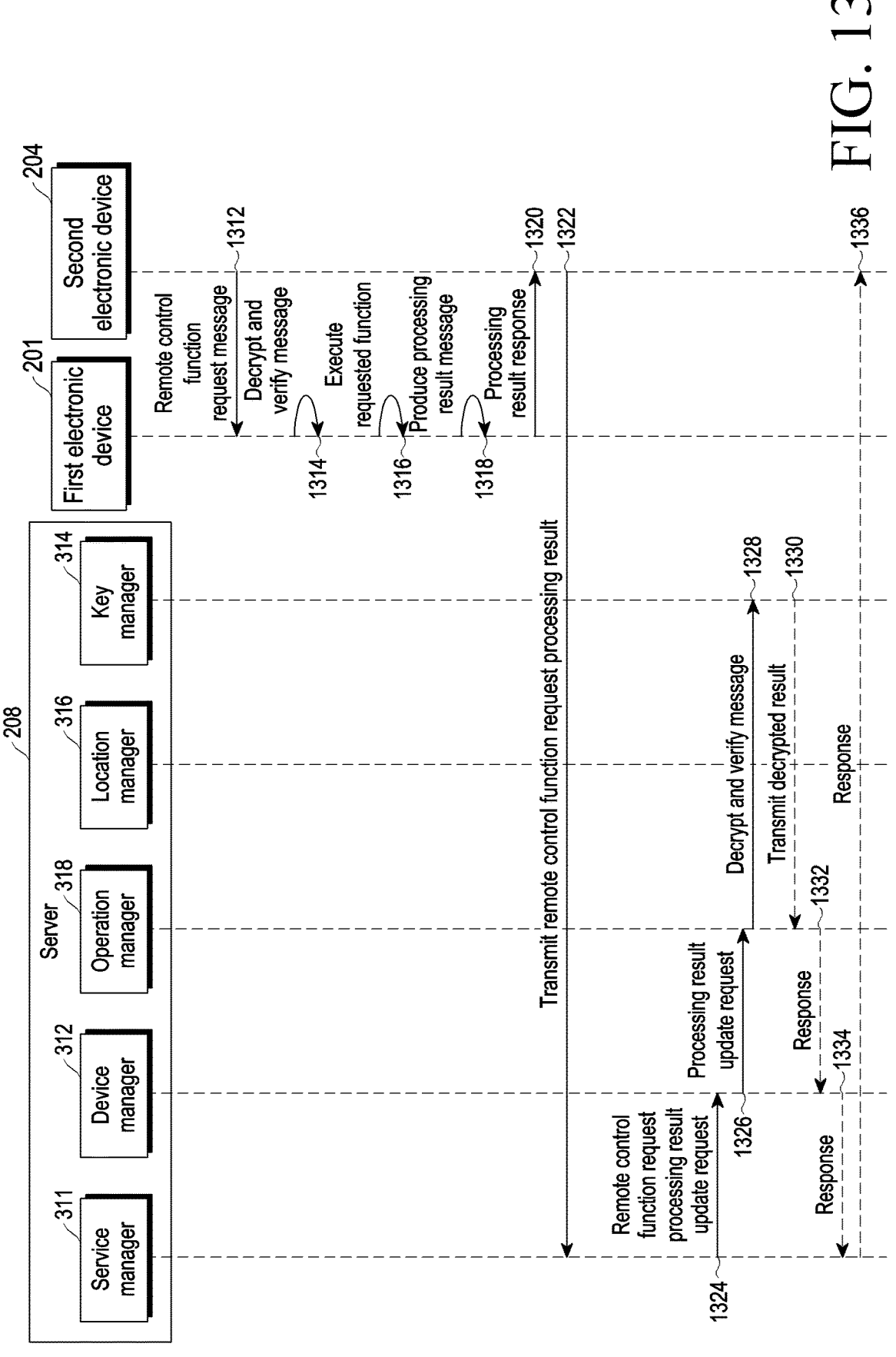
FIG. 13 is an operational diagram illustrating an operation of executing a remote control function and transmitting a remote control function processing result in a first electronic device according to an embodiment of the disclosure.

FIG. 13 is an operational diagram illustrating an operation of executing a remote control function and transmitting a remote control function processing result in a first electronic device according to an embodiment of the disclosure.

Referring to FIG. 13, in operation 1312, upon receiving an encrypted remote control function request message, the second electronic device 204 may transmit the encrypted remote control function request message to the first electronic device 201 connected through a BLE communication connection.

In operation 1314, the first electronic device 201 may decrypt and authenticate the encrypted remote control function request message. For example, the first electronic device 201 may decrypt and authenticate the encrypted remote control function request message using key information previously shared with the server 208 to obtain a remote control function request message.

In operation 1316, the first electronic device 201 may execute a requested function, based on information included in the remote control function request message. For example, the requested function may include a locking function or an initialization function.

In operation 1318, the first electronic device 201 may produce a remote control function request processing result message. The first electronic device 201 may produce a remote control function request processing result message including a processing completion message if the requested remote control function is completely processed and produce a remote control function request processing result message including an error response message if an error occurs in processing the requested remote control function.

In operation 1320, the first electronic device 201 may transmit an encrypted remote control function request processing result response message to the second electronic device 204. The first electronic device 201 may encrypt the remote control function request processing result message using key information shared with the server 208 to produce an encrypted remote control function request processing result response message and transmit the encrypted remote control function request processing result response message to the second electronic device 204 through BLE communication.

In operation 1322, the second electronic device 204 may transmit the encrypted remote control function request processing result message to the server 208.

In operation 1324, upon receiving the encrypted remote control function request processing result message, the service manager 311 of the server 208 may request the device manager 312 to update the remote control function request processing result.

In operation 1326, the device manager 312 of the server 208 may request the operation manager 318 to update the remote control function request processing result. The operation manager 318 according to an embodiment may update that the encrypted remote control function request processing result message is received in response to the transmission of the encrypted remote control function request message.

In operation 1328, the operation manager 318 of the server 208 may request the key manager 314 to decrypt and authenticate the encrypted remote control function request processing result message.

In operation 1330, the key manager 314 of the server 208 may decrypt and authenticate the encrypted remote control function request processing result message using key information previously shared with the first electronic device 201 and transmit the decrypted remote control function request processing result message to the operation manager 318.

In operation 1332, the operation manager 318 of the server 208 may transmit a response notifying that the remote control function request processing result message has been received to the device manager 312.

In operation 1334, the device manager 312 of the server 208 may transmit the response notifying that the remote control function request processing result message has been received to the service manager 311.

In operation 1336, the service manager 311 of the server 208 may transmit the response notifying that the remote control function request processing result message has been received to the second electronic device 204.

The server 208 according to an embodiment of the disclosure may provide (or produce) a UI displaying information about the remote control function request processing result, based on the remote control function request processing result message. For example, the server 208 may further include a viewer manager (not shown) and, when a user requests information about a remote control function request processing result through an electronic device (not shown), query information about a recent remote control function request processing result from the operation manager 318 through the viewer manager (not shown), and produce and display a UI corresponding to the information on the remote control function request processing result. For example, when the remote control function request processing result reported by the second electronic device 204 is transmitted to the operation manager 318, the server 208 may produce and display a UI corresponding to the information about the remote control function request processing result through the viewer manager (not shown).

Figure 14:
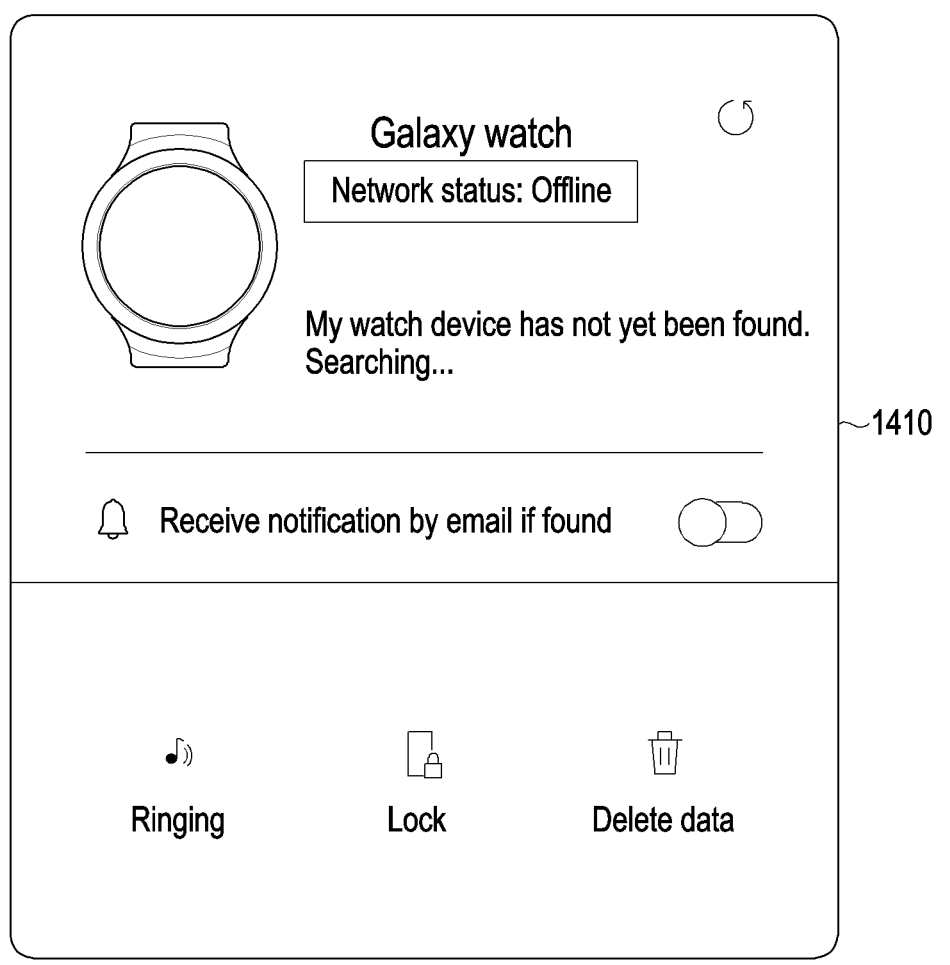
FIG. 14 is a screen showing that finding a lost first electronic device is in progress according to an embodiment of the disclosure.

FIG. 14 is a screen showing that finding a lost first electronic device is in progress according to an embodiment of the disclosure.

Referring to FIG. 14, the server 208 may activate an offline finding service, based on a user's report of loss of the first electronic device 201 (e.g., a smart watch), and provide offline finding service screen information.

For example, the server 208 may provide information about an offline finding service screen to be displayed on a screen of a user's electronic device (not shown) that is accessing the server 208. An offline finding service screen 1410 may be displayed on the screen of the user's electronic device (not shown). For example, the offline finding service screen 1410 may include information such as the name of an offline finding service target device (e.g., Galaxy watch), the network state of the offline finding service target device (e.g., network state: offline), and/or notification configuration (e.g., configuration of a notification by email when found). For example, the offline finding service screen 1410 may further include requestable remote control function information including ringing, lock, and/or delete data. For example, ringing may be a remote control function capable of requesting the offline finding service target device to ring a sound. Locking may be a remote control function capable of requesting the offline finding service target device to execute a locking function. Data deletion may be a remote control function capable of requesting the offline finding service target device to delete data.

Figure 15A:
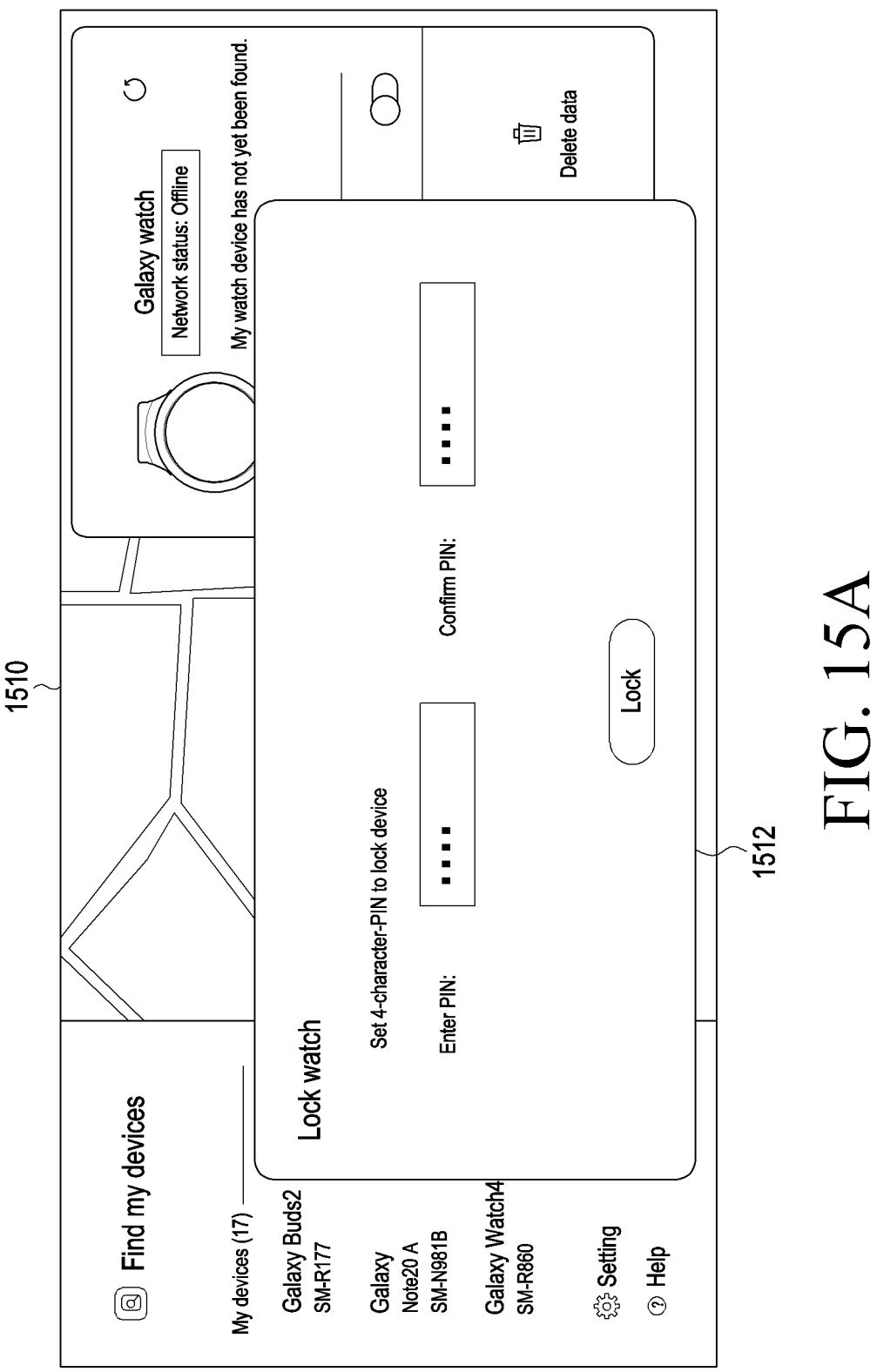
FIG. 15A is a remote locking function request screen according to an embodiment of the disclosure.

FIG. 15A is a remote locking function request screen according to an embodiment of the disclosure.

Referring to FIG. 15A, the server 208 may provide screen information for requesting a remote locking function of the first electronic device 201 (e.g., a smart watch). For example, the server 208 may provide screen information for requesting a remote locking function to be displayed on a screen of a user's electronic device (not shown) that is accessing the server 208. A remote locking function request screen 1510 may be displayed on the screen of the user's electronic device (not shown), based on the screen information for the remote locking function request. For example, if lock is selected from the offline finding service screen 1410, a remote locking function request screen 1510 may be displayed, and an input window 1512 for a personal identification number (PIN) for locking may be displayed on the remote locking function request screen 1510, and a remote locking function may be requested based on input of a PIN by the user.

Figure 15B:
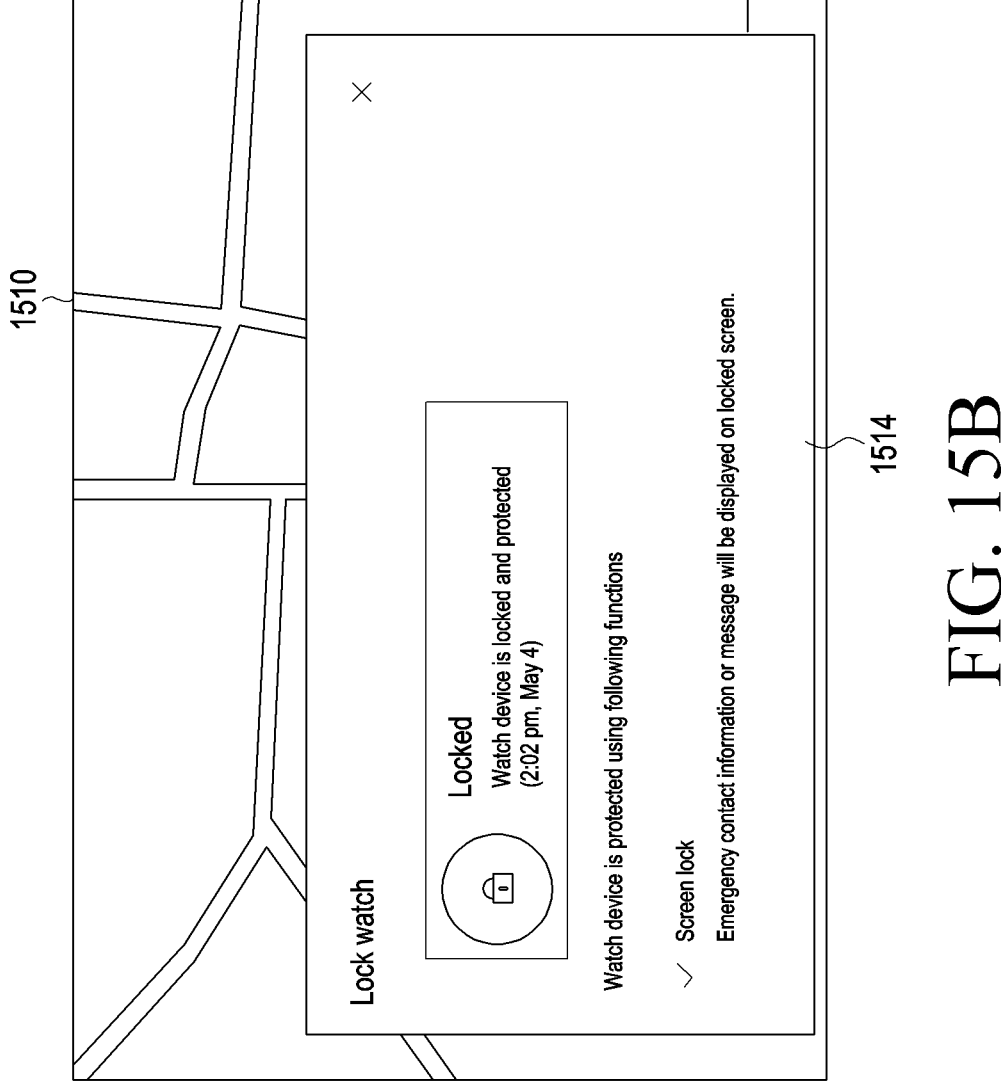
FIG. 15B is a screen showing a result of executing a remote locking function according to an embodiment of the disclosure.

FIG. 15B is a screen showing a result of executing a remote locking function according to an embodiment of the disclosure.

Referring to FIG. 15B, the server 208 may provide remote locking function request processing result screen information for the first electronic device 201 (e.g., a smart watch). For example, the server 208 may provide remote locking function request processing result screen information to be displayed on a screen of a user's electronic device (not shown) that is accessing the server 208. A remote locking function request processing result screen 1514 may be displayed on the screen of the user's electronic device (not shown), based on the remote locking function request processing result screen information. For example, information indicating that the first electronic device 201 is in a locked state may be displayed on the remote locking function request processing result screen 1514.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment of the disclosure, there may be provided a non-volatile storage medium storing instructions configured to cause, when executed by the electronic device, the electronic device to perform at least one operation, and the at least one operation may include obtaining key information associated with a first electronic device, receiving a virtual ID and location information based on the key information from a second electronic device, identifying the first electronic device corresponding to the virtual ID using the key information, when a remote control function request message for the first electronic device exists, encrypting the remote control function request message using the key information, transmitting the encrypted remote control function request message to the second electronic device, receiving, from the second electronic device, a remote control function request processing result message encrypted in the first electronic device in response to the encrypted remote control function request message, and decrypting the encrypted remote control function request processing result message using the key information to obtain a remote control function request processing result.

While the disclosure has been shown and disclosed with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
at least one first communication module for communicating with a server;
a second communication module for communicating with an external device within a short-range;
a global navigation satellite system (GNSS) module for obtaining a location information of the electronic device;
memory storing instructions; and
a processor,
wherein the instructions, when executed by the processor, cause the electronic device to:
identify that the electronic device is in a state which a communication with the server using the at least one first communication module is not available in a lost mode, and
broadcast, using the second communication module, an advertising packet comprising an identification (ID) and the location information of the electronic device,
wherein the location information of the electronic device included in the advertising packet is for causing the server to receive the location information of electronic device through an external device receiving the advertising packet on behalf of the electronic device.

2. The electronic device of claim 1, wherein the instructions, when executed by the processor, further cause the electronic device to:
establish a communication connection with the external electronic device, based on a communication connection request received from the external electronic device in response to the advertising packet,
receive an encrypted remote control function request message from the external electronic device through the communication connection,
decrypt the encrypted remote control function request message using key information related to the ID, and
perform a remote control function requested by the decrypted remote control function request message.

3. The electronic device of claim 1, wherein the instructions, when executed by the processor, further cause the electronic device to:
receive, based on lost service registration for the electronic device in an external server, the key information from the external server, and
store the key information in the memory.

4. The electronic device of claim 1, wherein the key information comprises a secret key and an initial vector.

5. The electronic device of claim 1, wherein the ID is obtained based on an international mobile equipment identity (IMEI) of the electronic device.

6. An electronic device comprising:
a communication module;
memory storing instructions; and
a processor,
wherein the instructions, when executed by the processor, cause the electronic device to:
obtain location information of an external electronic device based on receiving an advertising packet comprising an identification (ID) of the external electronic device and the location information of the external electronic device from the external electronic device,
transmit the ID and the location information to an external server,
receive, from the external server, an encrypted remote control function request message in response to the transmission of the ID and the location information,
establish a communication connection with the external electronic device, and
transmit the encrypted remote control function request message to the external electronic device through the communication connection.

7. A method for remote control of an electronic device, the method comprising:
obtaining key information associated with a first electronic device;
receiving an identification (ID) and location information based on the key information from a second electronic device;
identifying the first electronic device corresponding to the ID using the key information;
based on a remote control function request message for the first electronic device existing, encrypting the remote control function request message using the key information;
transmitting the encrypted remote control function request message to the second electronic device;
receiving, from the second electronic device, a remote control function request processing result message encrypted in the first electronic device in response to the encrypted remote control function request message; and
decrypting the encrypted remote control function request processing result message using the key information to obtain a remote control function request processing result.

8. The method of claim 7, further comprising:
generating the key information associated with the first electronic device;
storing the generated key information, based on lost service registration for the first electronic device; and
transmitting the key information associated with the first electronic device to the first electronic device.

9. The method of claim 7, wherein the key information comprises a secret key and an initial vector (VI).

10. The method of claim 7, further comprising:
generating a plurality of IDs for device information of the first electronic device using the key information;
storing the generated plurality of IDs; and
identifying the received ID from among the plurality of IDs.

11. The method of claim 10, wherein the device information of the first electronic device comprises an international mobile equipment identity (IMEI).

12. The method of claim 7, wherein a remote control function requested by the remote control function request message is a locking function or an initialization function.

13. A method of executing a remote request function in an electronic device, the method comprising:

identifying that the electronic device is in a state which a communication with a server using at least one first communication module of the electronic device is not available in a lost mode; and broadcasting, using a second communication module of the electronic device, an advertising packet comprising an identification (ID) and a location information of the electronic device obtained using a GNSS (global navigation satellite system) module of the electronic device, wherein the location information of the electronic device is included in the advertising packet is for causing the server to receive the location information of electronic device through an external device receiving the advertising packet on behalf of the electronic device.

14. The method of claim 13, further comprising:

establishing a communication connection with the external electronic device, based on a communication connection request received from the external electronic device in response to the advertising packet;

receiving an encrypted remote control function request message from the external electronic device through the communication connection;

decrypting the encrypted remote control function request message using key information related to the ID; and performing a remote control function requested by the decrypted remote control function request message.

15. The method of claim 13, further comprising:

identifying that the electronic device is in the lost mode.

16. The method of claim 15, wherein the identifying that the electronic device is in the lost mode comprises identifying that the electronic device is in the lost state based on a failure to connect to an external electronic device.

17. The method of claim 15, further comprising:

transitioning the electronic device to the lost mode.

18. The method of claim 17, further comprising:

enabling, through the second communication module, a Bluetooth low energy (BLE) communication function while in the lost mode.

19. The electronic device of claim 2, wherein the instructions, when executed by the processor, cause the electronic device to:

generate a remote control function request processing result message for the requested remote control function, encrypt the remote control function request processing result message using the key information, and transmit the encrypted remote control function request processing result message to the external electronic device, and wherein an account of the electronic device is different from an account of the external electronic device.

20. The method of claim 14, further comprising:

generating a remote control function request processing result message for the requested remote control function;

encrypting the remote control function request processing result message using the key information; and transmitting the encrypted remote control function request processing result message to the external electronic device.

* * * * *